(12) United States Patent
Wendeler-Goeggelmann

(10) Patent No.: US 11,181,466 B2
(45) Date of Patent: Nov. 23, 2021

(54) MONITORING DEVICE AND METHOD FOR MONITORING CORROSION OF A WIRE MESH

(71) Applicant: Geobrugg AG, Romanshorn (CH)

(72) Inventor: Corinna Wendeler-Goeggelmann, Herisau (CH)

(73) Assignee: Geobrugg AG, Romanshorn (CH)

( * ) Notice: Subject to any disclaimer, the term of this patent is extended or adjusted under 35 U.S.C. 154(b) by 6 days.

(21) Appl. No.: 16/652,467

(22) PCT Filed: Sep. 28, 2018

(86) PCT No.: PCT/EP2018/076389
§ 371 (c)(1),
(2) Date: Mar. 31, 2020

(87) PCT Pub. No.: WO2019/072587
PCT Pub. Date: Apr. 18, 2019

(65) Prior Publication Data
US 2020/0232904 A1 Jul. 23, 2020

(30) Foreign Application Priority Data

Oct. 12, 2017 (DE) .................... 10 2017 123 810.7

(51) Int. Cl.
*G01N 17/00* (2006.01)
*G01N 17/04* (2006.01)
*G01N 17/02* (2006.01)

(52) U.S. Cl.
CPC ......... *G01N 17/006* (2013.01); *G01N 17/008* (2013.01); *G01N 17/04* (2013.01); *G01N 17/02* (2013.01)

(58) Field of Classification Search
CPC ............................. G01N 17/006; G01N 17/04
(Continued)

(56) References Cited

U.S. PATENT DOCUMENTS 4,703,253 A 10/1987 Strommen
6,279,858 B1 * 8/2001 Eicher .................... B21D 11/07
245/8

(Continued)

FOREIGN PATENT DOCUMENTS

CN 104007058 A * 8/2014
CN 107749145 A * 3/2018
(Continued)

OTHER PUBLICATIONS

PCT/EP2018/076389—Written Opinion of the International Searching Authority—English (Year: 2021).*

(Continued)

*Primary Examiner* — Patrick Assouad
*Assistant Examiner* — Sean Curtis
(74) *Attorney, Agent, or Firm* — Posz Law Group, PLC

(57) ABSTRACT

A monitoring device, in particular a wire netting monitoring device, for a wire netting, in particular for a protective net for stabilizing, catching and/or intercepting and/or retaining heavy loads, has at least two inter-engaging net elements, at least one net element of which is produced from at least one single wire, a wire bundle, a wire strand, a wire rope and/or some other longitudinal element having at least one wire, in particular produced from a high-tensile steel, wherein the monitoring device comprises at least one corrosion monitoring unit configured for monitoring at least one corrosion indicator.

34 Claims, 10 Drawing Sheets

Figure 1:
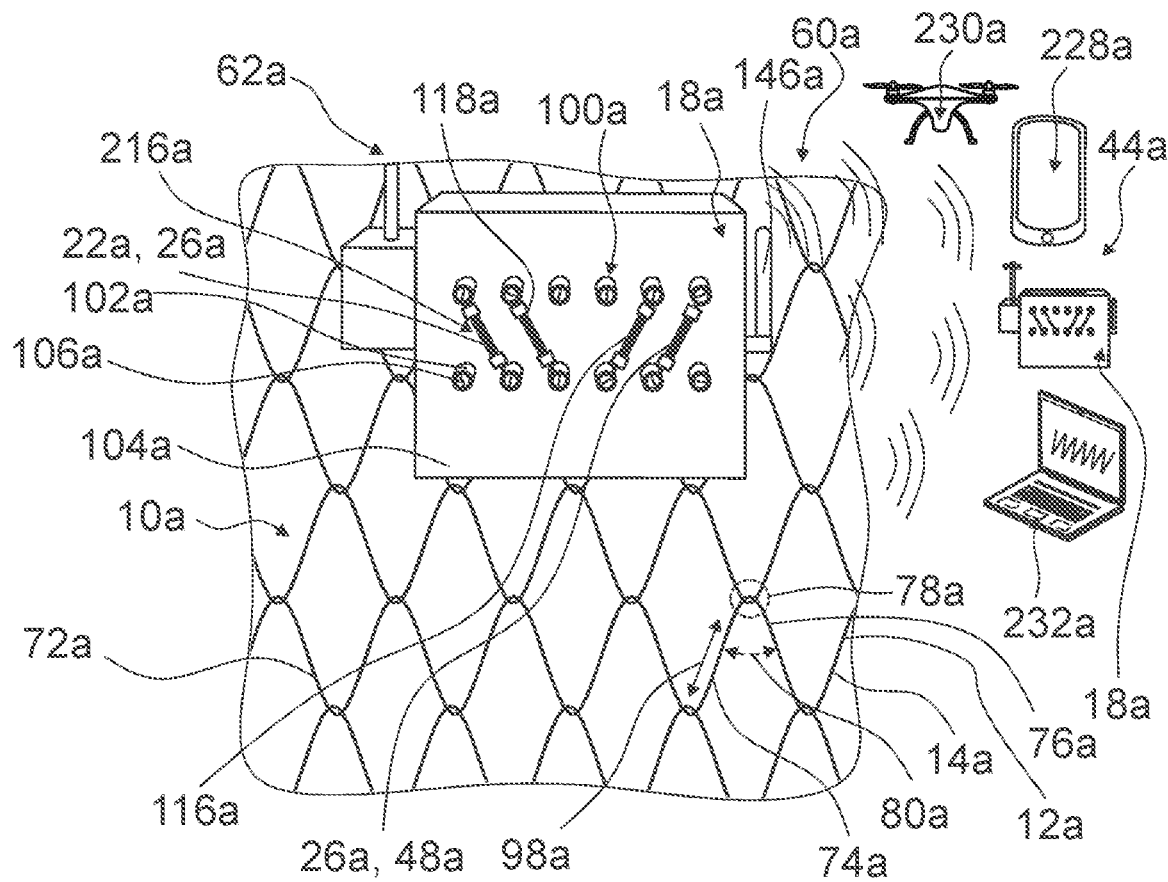

(58) Field of Classification Search
USPC .................................................. 324/71.2, 700
See application file for complete search history.

(56) References Cited

U.S. PATENT DOCUMENTS

| | | | | |
|---|---|---|---|---|
| 6,917,294 | B2* | 7/2005 | Larsen | A01K 75/00 340/573.2 |
| 7,088,257 | B2* | 8/2006 | Weekes | A45C 13/18 324/541 |
| 8,085,165 | B2* | 12/2011 | Wavering | G01N 17/04 340/870.02 |
| 8,251,612 | B2* | 8/2012 | Hartman | F03B 13/1845 405/68 |
| 8,449,220 | B2* | 5/2013 | Hartman | F03B 13/1845 405/68 |
| 8,678,709 | B2* | 3/2014 | Utz | F41H 11/08 405/72 |
| 9,128,018 | B2* | 9/2015 | Sugano | G01N 3/32 |
| 9,333,553 | B2* | 5/2016 | Wartmann | E01F 7/04 |
| 9,395,290 | B2* | 7/2016 | Bridges | G01N 17/04 |
| 9,452,467 | B2* | 9/2016 | Atz | A01K 61/60 |
| 9,638,652 | B2* | 5/2017 | Ghods | G01N 27/02 |
| 9,829,452 | B2* | 11/2017 | Orazem | G01N 17/04 |
| 9,927,381 | B2* | 3/2018 | Schindelholz | G01N 27/026 |
| 9,970,213 | B2* | 5/2018 | Li | E04H 17/06 |
| 10,031,066 | B1* | 7/2018 | Brown | G01N 17/02 |
| 10,058,909 | B2* | 8/2018 | Wendeler-Goeggelmann | B21F 27/02 |
| 10,145,045 | B2* | 12/2018 | Wendeler-Goeggelmann | D04C 1/06 |
| 10,247,691 | B1* | 4/2019 | Sagues | G01N 33/383 |
| 10,317,358 | B1* | 6/2019 | Sagues | G01N 17/006 |
| 10,544,552 | B2* | 1/2020 | Wendeler-Goeggelmann | E04H 17/04 |
| 10,549,335 | B2* | 2/2020 | Wendeler-Goeggelmann | B21F 27/005 |
| 10,571,418 | B2* | 2/2020 | Ghods | G01N 27/026 |
| 10,597,833 | B2* | 3/2020 | Wendeler-Goeggelmann | E01F 7/04 |
| 10,768,092 | B2* | 9/2020 | Friedersdorf | G01N 27/22 |
| 10,768,093 | B2* | 9/2020 | Friedersdorf | G01N 17/04 |
| 10,768,130 | B2* | 9/2020 | Ghods | G01N 33/383 |
| 10,857,588 | B2* | 12/2020 | Wendeler-Goeggelmann | E01F 7/04 |
| 2006/0125493 | A1* | 6/2006 | Subramanian | G01N 17/04 324/700 |
| 2007/0120572 | A1* | 5/2007 | Chen | G01N 17/04 324/700 |
| 2007/0131917 | A1* | 6/2007 | Wartmann | E01F 7/045 256/12.5 |
| 2007/0210214 | A1* | 9/2007 | Wartmann | B21F 27/02 245/5 |
| 2008/0204275 | A1* | 8/2008 | Wavering | H04Q 9/00 340/870.16 |
| 2011/0038671 | A1* | 2/2011 | Hartman | F03B 13/1845 405/68 |
| 2012/0301331 | A1* | 11/2012 | Hartman | F03B 13/187 417/331 |
| 2013/0106447 | A1* | 5/2013 | Bridges | G01N 17/04 324/700 |
| 2014/0210494 | A1* | 7/2014 | Ghods | G01N 17/04 324/700 |
| 2014/0283619 | A1* | 9/2014 | Sugano | G01N 3/32 73/799 |
| 2015/0097589 | A1* | 4/2015 | Orazem | G01N 27/02 324/693 |
| 2015/0247815 | A1* | 9/2015 | Chen | G01N 17/02 324/686 |
| 2017/0227481 | A1* | 8/2017 | Ghods | G01N 27/026 |
| 2017/0306642 | A1* | 10/2017 | Li | E04H 17/06 |
| 2018/0214929 | A1* | 8/2018 | Wendeler-Goeggelmann | B21F 27/005 |
| 2018/0216266 | A1* | 8/2018 | Wendeler-Goeggelmann | B21F 27/04 |
| 2018/0238820 | A1* | 8/2018 | Ghods | G01N 17/02 |
| 2019/0321877 | A1* | 10/2019 | Wendeler-Goeggelmann | E01F 7/04 |
| 2019/0330810 | A1* | 10/2019 | Wendeler-Goeggelmann | E01F 7/04 |
| 2019/0344328 | A1* | 11/2019 | Wendeler-Goeggelmann | B21F 27/005 |
| 2019/0345680 | A1* | 11/2019 | Wendeler-Goeggelmann | E01F 7/045 |
| 2019/0368054 | A1* | 12/2019 | Gummow | G01N 17/02 |
| 2019/0381558 | A1* | 12/2019 | Wendeler-Goeggelmann | B21F 27/04 |
| 2020/0232904 | A1* | 7/2020 | Wendeler-Goeggelmann | G01N 17/006 |
| 2020/0267953 | A1* | 8/2020 | Wendeler-Goeggelmann | A01K 75/00 |
| 2020/0270831 | A1* | 8/2020 | Allen | E01B 5/18 |
| 2021/0023605 | A1* | 1/2021 | Ferraiolo | B21F 27/06 |
| 2021/0063336 | A1* | 3/2021 | Ghods | G01N 29/07 |
| 2021/0127701 | A1* | 5/2021 | Hohener | A23G 1/10 |

FOREIGN PATENT DOCUMENTS

| | | | | |
|---|---|---|---|---|
| CN | 106290035 B | * | 10/2018 | |
| CN | 111788470 A | * | 10/2020 | ............ G01N 17/04 |
| DE | 35 31 478 A1 | | 3/1987 | |
| DE | 36 29 704 C1 | | 1/1988 | |
| DE | 20 2004 004 766 U1 | | 7/2004 | |
| DE | 1 546 679 B1 | | 12/2014 | |
| DE | 102017123810 A1 | * | 4/2019 | ........... G01N 17/006 |
| DE | 102017123817 A1 | * | 4/2019 | ............ G01N 17/02 |
| JP | 2000-227989 A | | 8/2000 | |
| JP | 2000321099 A | * | 11/2000 | |
| JP | 2001-004525 A | | 1/2001 | |
| JP | 2007-292747 A | | 11/2007 | |
| JP | 2008-157647 A | | 7/2008 | |
| JP | 2017-26613 A | | 2/2017 | |
| JP | 2018122360 A | * | 8/2018 | ............. B21F 23/00 |
| JP | 2020064037 A | * | 4/2020 | ............ G01N 17/04 |
| JP | 2020535430 A | * | 12/2020 | ............ G01N 17/04 |
| KR | 20200052348 A | * | 5/2020 | ............ G01N 17/04 |
| WO | 03/003823 A1 | | 1/2003 | |
| WO | 2005/120744 A1 | | 12/2005 | |
| WO | WO-2019072587 A1 | * | 4/2019 | ........... G01N 17/006 |
| WO | WO-2020079864 A1 | * | 4/2020 | ............ G01N 27/26 |
| WO | WO-2021028480 A1 | * | 2/2021 | ............ G01N 17/00 |

OTHER PUBLICATIONS

English Translation of CN 104007058 A. (Year: 2021).*
Collins et al., Real time detection of rock fall events using a microseismic railway monitoring system. 2014. Geohazards6, Kingston, Canada (Year: 2014).*
Yan et al., Monitoring and early warning method for a rockfall along railways based on vibration signal characteristics. Scientific Reports | (Apr. 29, 2019) 9:6606 | https://doi.org/10.1038/s41598-019-43146-1 (Year: 2019).*
International Search Report dated Feb. 12, 2019 issued in corresponding International Patent Application No. PCT/EP2018/076389.
International Preliminary Report on Patentability dated Apr. 14, 2020 issued in corresponding International Patent Application No. PCT/EP2018/076389.
Search Report dated Oct. 12, 2018 issued in corresponding DE Patent Application No. 10 2017 123 810.7 (partial English translation only).
JFE Techno-Research Corporation, "Atmospheric Corrosion Monitoring by ACM Type Corrosion Sensor," Aug. 24, 2017. URL: https://www.jfe-tec.co.jp/en/tech-consul/fushoku16.html.
F. Deflorian et al., "Corrosion behaviour of steel ropes for snow and rockfall barriers," Corrosion Engineering, Science and Technology, GB, vol. 39, No. 3, Sep. 1, 2004, pp. 250-254.
Jürgen Suda et al., "Technischer Steinschlagschutz Handbuch zur Durchführung einer Bauwerkskontrolle," Oct. 21, 2013. URL: https://www.bmnt.gv.at/dam/jcr:8e2227ab-6ec5-437b-8d99-c6c6e642354d/Handbuch_Steinschlag_20131021.pdf (retrieved on Jan. 31, 2019).

(56) References Cited

OTHER PUBLICATIONS

Tüv Süd Chemie Service GmbH, "Korrosionsüberwachung mit Coupons leichtgemacht—Werkstoffprobenhalter für den betrieblichen Einsatz," Jun. 15, 2001. URL: https ://www.tuev-sued.de/uploads/images/1433839673920559861316/ac990-korrueb-kb-21 0x297-w-15-06-0l.pdf (retrieved on Feb. 4, 2019).
Andrea Luciani et al., "Politecnico di Torino Porto Institutional Repository [Proceeding] Maintenance of Rockfall Net Fences," 6th Interdisciplinary Workshop on Rockfall Protection Rocexs 2017, Jul. 1, 2017, pp. 22-24.
Examination Report dated Nov. 30, 2020 issued in corresponding AU patent application No. 2018350280.
Examination Report dated Nov. 20, 2020 issued in corresponding RU patent application No. 2020 115 308 (and partial English translation).
Office Action dated Aug. 7, 2020 issued in corresponding AU patent application No. 2018350280.
Examination Report dated Apr. 20, 2021 issued in corresponding CA patent application No. 3,075,222.
Examination Report dated Apr. 13, 2021 Issued in corresponding IN patent application No. 202017011662.
Examination Report dated Apr. 6, 2021 issued in corresponding JP patent application No. 2020-517960 (and English translation).
Examination Report dated Apr. 20, 2021 issued in corresponding KR patent application No. 10-2020-7010193 (and Partial English translation).
Chilean Office Action dated Jun. 14, 2021, issued in corresponding CL Patent Application No. 202000823 (and Partial English Machine Translation).

* cited by examiner

MONITORING DEVICE AND METHOD FOR MONITORING CORROSION OF A WIRE MESH

CROSS REFERENCE TO RELATED APPLICATIONS

This application is a U.S. national stage application of PCT/EP2018/076389 filed on Sep. 28, 2018, which is based on German Patent Application No. 10 2017 123 810.7 filed on Oct. 12, 2017, the contents of which are incorporated herein by reference.

PRIOR ART

The invention relates to a monitoring device as claimed in the preamble of claim 1 and to a method for monitoring corrosion of a wire netting as claimed in the preamble of claim 30.

The object of the invention consists, in particular, in providing a device of the generic type and a method having advantageous properties with regard to safety. The object is achieved according to the invention by means of the features of patent claims 1 and 30, while advantageous configurations and developments of the invention can be gathered from the dependent claims.

Advantages of the Invention

The invention is based on a monitoring device, in particular a wire netting monitoring device, for a wire netting, in particular for a protective net for stabilizing, in particular static structures, and/or for catching and/or intercepting and/or retaining heavy loads, having at least two inter-engaging net elements, at least one net element of which is produced from at least one single wire, a wire bundle, a wire strand, a wire rope and/or some other longitudinal element having at least one wire, in particular produced from a high-tensile steel.

It is proposed that the monitoring device comprises at least one corrosion monitoring unit configured for monitoring at least one corrosion indicator. As a result, it is possible to provide in particular advantageous properties, in particular of the wire netting, with regard to safety. Advantageously, a protective effect and/or a durability of a wire netting, in particular of a wire netting installation, can be monitored, as a result of which in particular malfunctions can be avoided. In particular, advantageously a simple determination of a service life of a wire netting can be made possible; in particular, an end of a service life can be ascertained and/or a remaining service life can be estimated. Moreover, remote monitoring can advantageously be made possible, whereby direct on-site monitoring by a person can advantageously be replaced, thereby making it possible to reduce in particular costs, workloads and/or accident hazards, in particular since wire nettings are often installed at inaccessible, unsafe terrains. Furthermore, data about location-dependent corrosion can advantageously be collected, as a result of which an adaptation of wire netting properties to specific ambient conditions in the case of future installations of wire nettings at comparable sites can be made possible. In particular an efficiency can be improved as a result. Moreover, it is conceivable for the monitoring device to be configured for ascertaining and/or estimating a corrosiveness of a location independently of a wire netting, in particular prior to installation of a wire netting. For this purpose, advantageously the corrosion monitoring unit can be constructed independently of a wire netting at the location and a corrosiveness of an environment at a location can be deduced in particular by means of the corrosion indicator ascertained. As a result, advantageously a prior estimation of location conditions can be made possible, as a result of which in particular a design of a structural assembly, for example of a protective net, at the location can be optimized.

In particular, the wire netting is embodied as slope stabilization, as a safety fence, as a catch fence, as a rockfall protective net, as a barrier fence, as a fish farming net, as a predator protective net, as an enclosure fence, as a tunnel safeguard, as landslide protection, as a motorsport protective fence, as a road fence, as avalanche protection or the like. Particularly on account of its high strength and/or loading capacity, applications as covering and/or cladding, for example of power plants, factory buildings, dwellings or other buildings, as explosion protection, as projectile protection, as shielding against flying objects, as a safety net, as ram protection or the like are also conceivable. The wire netting can be laid out and/or arranged and/or mounted for example horizontally or vertically or obliquely, in particular relative to a base. In particular, the wire netting is embodied in a planar fashion. Advantageously, the wire netting is constructed regularly and/or periodically in at least one direction. “Heavy loads” should be understood to mean, in particular, preferably integral, loads having a weight of at least 1 kg, preferably at least 10 kg, preferably at least 100 kg or particularly preferably at least 1000 kg. “Integral” should be understood to mean, in particular, shaped in one piece.

A “net element” should be understood to mean, in particular, an, in particular separable, basic element of the wire netting, preferably of the protective net, which forms the wire netting, in particular the protective net, by means of inter-engaging with adjacent basic elements. The net element is embodied in particular as a filament-like structure, in particular wire structure, for example composed of at least one single wire, at least one wire bundle, at least one wire strand and/or at least one wire rope. The filament-like structure, in particular wire structure, can in particular have two open ends or be closed on itself. Preferably, the filament-like structure, in particular wire structure, in a non-loaded state, lies at least substantially in one plane. The net element can have in particular an irregular shape or preferably a regular shape, constituting at least partly a shape of a circle, of a rhombus and/or of a uniform and/or irregular polygon. In particular, different net elements of the safety net can have different shapes; preferably, however, the net elements have an at least substantially identical shape. Preferably, the net element is embodied as a helix, in particular a flattened helix, or as a ring, in particular a wire ring. In particular, the net element at least partly forms a mesh link of a ring mesh or a helix of a meshing. Preferably, “at least substantially identical” should be understood to mean identical apart from production tolerances and/or within the scope of production engineering possibilities.

Advantageously, the wire, in particular the wire bundle, the wire strand, the wire rope and/or the other longitudinal element having the at least one wire, is produced from high-tensile steel at least partly, in particular completely apart from a coating. Preferably, the wire is a high-tensile steel wire. By way of example, the high-tensile steel can be spring steel and/or wire steel and/or a steel suitable for wire ropes. In particular, the wire has a tensile strength of at least 800 N $mm^{-2}$, advantageously of at least 1000 N $mm^{-2}$, particularly advantageously of at least 1200 N $mm^{-2}$, preferably of at least 1400 N $mm^{-2}$ and particularly preferably of at least 1600 N mm$^{-2}$, in particular a tensile strength of approximately 1770 N mm$^{-2}$ or approximately 1960 N mm$^{-2}$. It is also conceivable for the wire to have an even higher tensile strength, for example a tensile strength of at least 2000 N mm$^{-2}$, or of at least 2200 N mm$^{-2}$, or even of at least 2400 N mm$^{-2}$. As a result, it is possible to achieve a high loading capacity, in particular a high tensile strength and/or a high stiffness transversely with respect to the wire netting. In addition, advantageous bending properties can be achieved. In particular, the wire, preferably a plurality of wires, is configured for at least partly forming a wire braiding, consisting in particular of net elements, preferably helices and/or rings. "Configured" is in particular to mean specifically programmed, designed and/or equipped. The fact that an object is configured for a specific function is in particular to mean that the object fulfils and/or performs this specific function in at least one use state and/or operating state. The corrosion indicator comprises in particular at least one corrosion-influenceable property, in particular material property and/or material constitution, in particular of at least one part of the wire netting and/or of at least one part of an element which is embodied separately from the wire netting and which is indicative of corrosion of the wire netting and/or is exposed preferably to ambient and/or weather conditions that are at least substantially identical to those to which the wire netting is exposed. Preferably, a status, an, in particular instantaneous, intensity and/or a progress of corrosion, in particular of at least one part of the wire netting, is determinable by means of the corrosion indicator. The corrosion indicator comprises in particular at least one surface coloration, for example a rust coloration, at least one surface constitution, at least one loss of weight, at least one tear resistance, at least one oscillation frequency, in particular resonant oscillation frequency, an electrical conductivity and/or an ohmic resistance of at least one part of the wire of the wire netting and/or of at least one part of the element embodied separately from the wire netting, and/or preferably a current flow, in particular between at least two electrodes, preferably embodied separately from the wire netting. The corrosion monitoring unit is configured in particular for detecting, registering and/or preferably sensing the corrosion indicator and in particular for making it accessible to a user and/or for automatically comparing it with a database for the purpose of estimating a state, a functionality and/or a safety of the wire netting.

Furthermore, it is proposed that the corrosion monitoring unit comprises at least one corrosion checking element configured for supplying at least partial information for determining the corrosion indicator. As a result, a simple corrosion determination can advantageously be made possible, as a result of which safety, in particular of a monitored wire netting, can advantageously be increased. In addition, the corrosion checking element can advantageously be positioned at a multiplicity of, preferably arbitrarily selectable, locations of a wire netting. Preferably, the corrosion checking element is embodied in a manner separated from the wire netting. In particular, the corrosion checking element is free of an electrically conductive contact with the wire netting. Alternatively, it is conceivable for the corrosion checking element to be embodied as a sacrificial anode. In particular, the corrosion checking element is exposed to ambient and/or weather conditions comparable, preferably at least substantially identical, to those to which at least one part of the wire netting is exposed. In particular, the corrosion checking element is at least configured for at least partly corroding, wherein corrosion, in particular a status, an intensity and/or a progress of corrosion, of the corrosion checking element is indicative of corrosion, in particular a status, an intensity and/or a progress of corrosion, of at least one part of the wire netting. Corrosion encompasses, in particular, white rust, red rust and/or further oxidizing, in particular material-eroding, chemical and/or physical processes and/or chemical and/or physical processes that alter material properties, for example strength and/or brittleness. In particular, the corrosion checking element can form a corrosion element. In particular, the corrosion element can form a corrosion checking element.

In addition, it is proposed that the corrosion checking element is embodied at least partly as an ACM (Atmospheric Corrosion Monitor) sensor. As a result, a simple and/or reliable corrosion determination can advantageously be made possible, as a result of which safety, in particular of a monitored wire netting, can advantageously be increased. Advantageously, a current flow proportional to corrosion, in particular material erosion, in particular of a coating, of the corrosion checking element can be obtained, from which current flow a temporal profile of material erosion, instantaneous material erosion and/or a present remaining material thickness of the corrosion checking element and/or of the coating of the corrosion checking element can advantageously be ascertained. Advantageously, by means of a sufficiently long determination of a temporal profile of material erosion, for example within one or a plurality of years, a time duration until complete erosion of a specific material thickness can be extrapolated. As a result, an estimation of a service life of a wire netting can advantageously be made possible. In particular, the ACM sensor is configured for determining a corrosiveness of an environment and/or corrosion rates, in particular erosion rates, of metals and/or alloys, preferably on the basis of a galvanic current flowing between metals and/or alloy. In particular, the ACM sensor comprises at least two electrodes which, in particular in the dry state, are electrically insulated from one another. Electrodes are formed in particular at least partly from different materials, preferably metals of different electropositivity. It is conceivable for at least one electrode to have at least one coating, as a result of which in particular at least the surface materials of at least two electrodes are different. Preferably, the surface materials are formed from metals of different electropositivity. Advantageously, at least one electrode is embodied substantially identically to at least one segment of a wire of the wire netting. As a result, the best possible transferability of the material erosion measured at the corrosion checking element to a material erosion of the wire netting can advantageously be achieved. Advantageously, at least one further electrode of the ACM sensor is formed at least partly from a more electropositive material than the electrode which is embodied substantially identically to the segment of the wire. The more electropositive material can comprise in particular steel, silver, gold, cobalt, nickel, copper, platinum, palladium, a further element above zinc in an electrochemical potential series and/or an alloy above zinc in the electrochemical potential series. In particular, the electrodes, in particular the electrodes having different surface materials, are arranged without touching one another. In particular, the electrodes, in particular the electrodes having different surface materials, are free of direct mutual electrical contacts. Preferably, the electrodes, in particular the electrodes having different surface materials, in a wet state, are electrically in contact by way of water droplets forming an electrolyte. In particular, a galvanic current flows when the electrodes are electrically contacted. The galvanic current flow brings about, in particular, material erosion and/or corrosion of the more electronegative electrode. The current flow is advantageously proportional to the material erosion. A presence and/or properties, in particular corrosion properties, of the electrolyte are dependent in particular on ambient conditions to which the corrosion checking element is exposed at a specific point in time, as a result of which it is advantageously possible to deduce a corrosiveness of the ambient conditions at the point in time.

Moreover, it is proposed that the corrosion checking element is embodied as a stick indicator having a plurality of differently coated corrosion checking sticks. As a result, a simple and/or cost-effective corrosion determination can advantageously be made possible, as a result of which safety, in particular of a monitored wire netting, can advantageously be increased. The stick indicator comprises in particular holders for at least two, with preference at least four, preferably at least six and particularly preferably at least eight, corrosion checking sticks. The stick indicator is configured in particular for mounting the corrosion checking sticks such that the corrosion checking sticks are exposed to corrosion that is substantially identical to that to which the wire netting to be monitored is exposed. In particular, the corrosion checking sticks have at least one coating having different coating thicknesses in each case. Preferably, the corrosion checking sticks are arranged in the stick indicator in a manner sorted according to ascending and/or descending coating thickness. In particular, the coating thickness of the corrosion checking stick having a maximum coating thickness is substantially identical to a coating thickness of a wire of the wire netting to be monitored. As a result, a good transferability of corrosion observed at the stick indicator to a state of the wire netting to be monitored can advantageously be made possible. The coating thicknesses of the further corrosion checking sticks are less than the maximum coating thickness, for example 10%, 20%, 30%, 40%, 50%, 60%, 70%, 80% and/or 90% of said maximum coating thickness. Alternatively, the corrosion checking sticks have zinc coatings having coating thicknesses of 25 $g/m^2$, 50 $g/m^2$, 100 $g/m^2$, 150 $g/m^2$, 200 $g/m^2$, 250 $g/m^2$ and 300 $g/m^2$ or 5 $g/m^2$, 10 $g/m^2$, 20 $g/m^2$, 40 $g/m^2$, 80 $g/m^2$, 160 $g/m^2$ and 320 $g/m^2$. In addition, it is conceivable for at least one corrosion checking stick to have a coating thickness which is greater than the coating thickness of the wire of the wire netting to be monitored. Advantageously, progress and/or a status of corrosion can be read off in a simple manner by means of optical inspection of the stick indicator. Progress and/or a status of corrosion can be ascertained in particular on the basis of a number of corrosion checking sticks of the stick indicator which exhibit corrosion phenomena, such as white rust and/or red rust, for example, after a specific aging time. It is conceivable for the stick indicator to be set up independently of a wire netting and/or before planned mounting of a wire netting at a site, in particular in order to assess a corrosiveness of an environment at a specific location. As a result, an optimization of a wire netting prior to installation can advantageously be made possible, for example by means of an adaptation of the coating thickness to corrosion to be expected at the location. In addition, a stick indicator can comprise in particular corrosion checking sticks comprising different materials, for example stainless steel, and/or different coating materials. As a result, it is possible to determine for example a suitable material and/or coating material for a specific location. The corrosion checking sticks preferably have a shape that is at least substantially identical to that of a segment of the wire of the wire netting to be monitored, in particular a stick shape. As a result, a good transferability of the test results to the wire netting can advantageously be achieved. Alternatively, it is conceivable for the corrosion checking sticks to have a shape deviating from a stick shape, for example a stick shape having at least one bend, a laminar shape, a spherical shape, a parallelepipedal shape, and/or a further geometric shape that is different than a stick. The stick indicator can advantageously be monitored by means of a camera of the corrosion monitoring unit. Alternatively or additionally, it is conceivable for the stick indicator to be surveyed by a user, for example periodically, and/or for the progress of corrosion of the individual corrosion checking sticks to be documented, in particular manually. Alternatively or additionally, it is conceivable for the stick indicator to be photographed by means of an, in particular automated and/or manually operable, camera drone, preferably periodically, in order to survey the progress of corrosion. As a result, it is advantageously possible to dispense with cabling, a radio link and/or traversal of, possibly rough, terrain by an operator, as a result of which costs and/or risks of injury can advantageously be reduced.

Furthermore, it is proposed that the corrosion monitoring unit comprises at least one data transfer module configured in particular at least for outputting at least one corrosion indicator ascertained. As a result, a user-friendliness can advantageously be achieved, for example by virtue of the fact that, by means of the data transfer module, the corrosion indicator can advantageously be configured for further electronic processing and/or for surveying by a user. It is conceivable for data, in particular corrosion indicators, to be communicated by means of the data transfer module to at least one computing unit, for example a central server, the local hub and/or an internal computing unit of the corrosion monitoring unit, for example a control and/or regulation unit of the corrosion monitoring unit. This computing unit is configured in particular for processing, analyzing, recording, collecting and/or representing, in particular graphically, the data, in particular the corrosion indicators.

Moreover, it is proposed that the corrosion monitoring unit comprises at least one data logger module configured for recording at least one output of the data transfer module. As a result, a temporal profile and/or a temporal development of a corrosion indicator, in particular of corrosion, can advantageously be ascertained and/or monitored. Preferably, the data logger module stores the corrosion indicator in a database of a storage unit. The storage unit can be embodied in particular as an internal storage unit of the corrosion monitoring unit, for example of the control and/or regulation unit, or as an external storage unit, for example of the computing unit. Preferably, a data logger module is configured for recording data, in particular corrosion indicators from a plurality of corrosion monitoring units and/or monitoring devices. As a result, a central database can advantageously be configured, as a result of which good clarity can advantageously be configured. It is conceivable for the data logger module to be configured at least for conditioning the recorded data for a graphical representation which is representable as a graphical overview on a display unit, for example a screen. By way of example, it is conceivable for an overview map accessible to a user to be created by means of the data stored by the data logger module, various wire nettings at various locations with the respective status, intensity and/or progress of the corrosion being represented on said map. Wire nettings which are near to the end of a service life and/or severely corroded could be represented in a highlighted manner, for example by being marked in color, in the overview map.

It is furthermore proposed that the corrosion monitoring unit comprises at least one communication module configured at least for communicating data output by the data transfer module, in particular notifications regarding progress, an intensity and/or a status of the corrosion, preferably warning and/or status messages regarding progress, an intensity and/or a status of the corrosion, preferably in an automated manner, to an external receiver, for example a smartphone, in particular for sending them in an automated manner by means of a telecommunication connection. As a result, user-friendliness can advantageously be increased further, in particular by virtue of the fact that up-to-date information is made available to a remote user at any time. In addition, safety of the wire netting to be monitored can advantageously be achieved, in particular by virtue of the fact that a corrosion impairment of a wire netting can be indicated to a responsible person in a timely manner. By means of a warning message, a responsible person can advantageously obtain information about states of wire nettings in a timely manner and without great effort, for example without studying measurement results. Preferably, the communication module has a radio capacity, in particular a mobile radio capacity. In particular, the communication module communicates by means of a mobile radio protocol, for example an EDGE, GPRS, HSCSD mobile radio protocol and/or preferably by means of a GSM mobile radio protocol. Preferably, besides the data output by the data transfer module, the communication module transmits further data, for example about a location, a time of day, a battery status, a function status, an ambient parameter and/or a weather parameter. A notification can comprise in particular at least one email, at least one SMS, at least one photograph, at least one video file and/or at least one internet data transfer, for example by means of an internet program such as a Newsfeed, WhatsApp and/or Skype. In particular, automated sending is effected periodically and/or after the occurrence of a predefined event, for example a threshold value being exceeded and/or undershot. An "external receiver" can be embodied in particular as at least one cellular phone, in particular a smartphone. Alternatively or additionally, the external receiver can be embodied as a drone situated in an environment of the communication module. A warning message can be embodied in particular as a text message, an image message and/or as a warning signal such as a warning sound and/or a warning light. By way of example, it is conceivable for a wire netting installation to comprise at least one warning light which starts to flash when a warning message is received. As a result, corroded and/or unsafe wire nettings within a wire netting installation having a multiplicity of wire nettings can advantageously be indicated in a simple manner.

In addition, it is proposed that the corrosion monitoring unit comprises at least one correction module configured at least for identifying and/or correcting systematic errors potentially occurring during monitoring of the corrosion, in particular during a measurement of the corrosion indicator. As a result, a high reliability and/or accuracy can advantageously be achieved. In particular, as a result, it is advantageously possible to obtain a suitability of the monitoring device at locations at which influences prevail which can lead to systematic errors, for example drifts of a measurement signal, in particular of the corrosion indicator. By way of example, in a salt-containing environment, salt deposits can occur on the corrosion indicator and can influence a conductivity measurement. By way of example, temperature fluctuations can have an influence on a measurement value of a current and/or voltage profile, in particular a detector, for example a current and/or voltage detector. The correction module is configured in particular for identifying systematic errors on the basis of a temporal signal profile of the corrosion indicator and/or with the aid of additional sensor data, such as temperature data, for example.

Furthermore, it is proposed that the corrosion monitoring unit comprises at least one electrical sensor unit configured for monitoring the at least one corrosion indicator. As a result, a measurement variable for corrosion can advantageously be determined, in particular in an automated manner. In particular, the electrical sensor unit is advantageously readable electrically, in particular in an automated manner, as a result of which continuous monitoring, in particular remote monitoring, can be made possible. Advantageously, the electrical sensor unit can operate independently of an operator, as a result of which costs, labor and accident risks can advantageously be reduced. In particular, the electrical sensor unit comprises a camera, a tension unit for exerting a mechanical stress on a corrosion element and/or a corrosion checking element, an oscillation unit for generating and/or detecting an oscillation frequency, in particular a resonant oscillation frequency, of a corrosion element and/or of a corrosion checking element, a voltage measuring unit and/or a resistance measuring unit.

Furthermore, it is proposed that the electrical sensor unit comprises at least one zero-resistance ammeter. As a result, a current flow can advantageously be measured without a, possibly corrosion-promoting, voltage being applied. In particular, as a result, a galvanic current flowing between two electrodes is reliably measurable, as a result of which a current value of an ACM sensor that is proportional to material erosion can advantageously be ascertained. A zero-resistance ammeter advantageously has an inherent resistance that is minimal, in particular mutually negligible for a measurement. Moreover, it is proposed that the corrosion indicator comprises at least an electrical conductivity of a corrosion element, at least an electrical resistance of a corrosion element and/or at least a current flow between at least two electrodes. As a result, a reliable measurement variable for corrosion can advantageously be ascertained. As a result, it is advantageously possible to achieve high safety for the wire netting to be monitored. In particular, an electrical resistance of a corrosion element rises as the corrosion progresses. In particular, an electrical resistance falls as the corrosion progresses. In particular, a current flow is proportional to a material erosion rate of at least one electrode, in particular of the corrosion element. The corrosion element is embodied in particular as an element configured for providing at least one measurement point, at least one measurement area and/or at least one measurement location for a measurement of the corrosion indicator, in particular by means of the electrical sensor unit. The corrosion element can in particular at least partly form at least one electrode of the ACM sensor. Preferably, the corrosion element at least partly forms an anode, in particular of the ACM sensor. The further electrode is in particular at least partly embodied as a cathode of the ACM sensor. The cathode is in particular at least partly formed from a more electronegative material than the anode. Preferably, the electrical sensor unit measures the corrosion indicator always and/or exclusively at the same corrosion element and/or at the same corrosion elements. As a result, monitoring of a temporal development of the corrosion indicator can advantageously be made possible. It is conceivable for the corrosion element to be embodied as a corrosion checking element which is embodied separately from the wire netting and which is free of an electrical contact with the wire netting, and/or to be embodied as at least one part of the wire netting, in particular of a wire of the wire netting, which can be embodied identically to and/or differently than further wires of the wire netting.

In addition, it is proposed that the corrosion indicator comprises at least an electrical conductivity of a coating of a corrosion element, at least an electrical resistance of a coating of a corrosion element and/or at least a current flow between at least a coating of at least one corrosion element and at least one further electrode. As a result, a reliable measurement variable for corrosion can advantageously be ascertained, which can be related in particular directly to the corrosion of the wire netting, in particular the corrosion of the anticorrosion protective layer of the wire netting. As a result, it is advantageously possible to achieve high safety for the wire netting to be monitored. In particular, the coating of the corrosion element, in particular of the corrosion checking element, is embodied as a zinc coating, as a zinc-aluminum coating and/or as a zinc-aluminum-magnesium coating. Preferably, the coating of the corrosion element, in particular of the corrosion checking element, is embodied at least substantially identically to a coating of at least one part of the wire netting, in particular of at least one part of a wire of the wire netting. Preferably, the coating of the corrosion element, in particular of the corrosion checking element, has a layer thickness that is at least substantially identical to that of at least one part of the coating of at least one part of the wire netting, in particular of at least one part of the wire of the wire netting. Alternatively, it is conceivable for the corrosion checking element to be embodied as an advance indicator. In the case of the advance indicator, in particular the layer thickness of the coating of the corrosion checking element is significantly less than the layer thickness of the coating of the wire. "Significantly less" should be understood to mean in particular at least 10% less, with preference at least 25% less, preferably at least 33% less or particularly preferably at least 50% less. As a result, corrosion of the corrosion checking element can advantageously become identifiable before corrosion of the wire of the wire netting, as a result of which early identification of corrosion can advantageously be made possible. Preferably, the coating of the corrosion element, in particular of the corrosion checking element, has a material constitution that is at least substantially identical to that of at least one part of the coating of at least one part of the wire netting, in particular of at least one part of the wire of the wire netting. Preferably, the coating of the corrosion element, in particular of the corrosion checking element, has a surface curvature that is at least substantially identical to that of at least one part of the coating of at least one part of wire netting, in particular of at least one part of the wire of the wire netting. Preferably, the coating of the corrosion element, in particular of the corrosion checking element, has a surface constitution that is at least substantially identical to that of at least one part of the coating of at least one part of the wire netting, in particular of at least one part of the wire of the wire netting.

Furthermore, it is proposed that a coating of a corrosion element, in particular of a corrosion checking element, is embodied at least substantially identically to an anticorrosion protective coating of at least one wire of a wire netting to be monitored. As a result, a reliable measurement variable for corrosion can advantageously be ascertained, which can be related in particular directly to the corrosion of the wire netting, in particular the corrosion of the anticorrosion protective layer of the wire netting. As a result, it is advantageously possible to achieve high safety for the wire netting to be monitored. In addition, a better transferability of the measurement results from the corrosion element to the wire netting can advantageously be made possible.

If the monitoring device comprises at least one electrical insulator, in particular at least for at least partially spatially delimiting a current flow through, in particular in, at least one corrosion element, a measurement of the corrosion indicator, in particular an accuracy of the measurement of the corrosion indicator, can advantageously be optimized, in particular by virtue of the fact that a current flow is able to be delimited to regions of the corrosion indicator that are subjected to the corrosion the most, for example surface regions of the corrosion indicator. As a result, it is advantageously possible to achieve high safety for the wire netting to be monitored. The electrical insulator can be embodied in particular as at least one insulating core in the interior of the corrosion element, in particular of the corrosion checking element. Alternatively, the insulator could be embodied as at least one insulating intermediate layer of the corrosion element, in particular of the corrosion checking element. The insulating intermediate layer could separate, in particular electrically isolate, in particular an inner wire, consisting of high-tensile steel, for example, from a coating. Preferably, the insulator delimits a current flow, determined and/or used in particular for ascertaining the corrosion indicator. Preferably, the insulator delimits the current flow to a part of a corrosion element, in particular corrosion checking element, which is particularly exposed to corrosion, for example an outer part and/or an, in particular outer, coating. In particular, the spatial delimitation is effected in a radial direction of a corrosion element, in particular corrosion checking element. In particular, the insulator is different than an outer insulating coating, for example an organic coating of a wire. In particular, the insulator is different than insulating end caps terminating a corrosion element and/or a wire in the longitudinal direction. Preferably, the coating has a good retention force on the insulator, which is at least 80%, with preference at least 90%, advantageously at least 100%, preferably at least 120% and particularly preferably at least 150%, of the retention force of the coating on, in particular high-tensile, steel. In one preferred embodiment, the insulator is configured for electrically insulating the corrosion element, in particular the corrosion checking element, which forms in particular an anode of the ACM sensor, from at least one electrode, embodied in particular as cathode, of the ACM sensor. In this case, the electrical insulator can be embodied at least partly as an air gap separating the electrodes. Preferably, a smallest distance formed by the air gap between two electrodes, in particular between a cathode and an anode of the ACM sensor, is at least less than 0.2 mm, with preference at least less than 0.15 mm, preferably at least less than 0.1 mm and particularly preferably at least greater than 0.05 mm. In a dry state, therefore, cathode and anode are advantageously electrically insulated and substantially free of material erosion. In a wet state, cathode and anode are electrically in contact, in particular, wherein a current flow, leading in particular to material erosion, is dependent on a composition of the electrolyte.

Furthermore, it is proposed that the electrical insulator is arranged at least partly in an interior of the corrosion element. As a result, a delimitation of the current flow to an outer layer and/or coating of the corrosion element, in particular corrosion checking element, can advantageously be achieved. Preferably, the electrical insulator is surrounded in its entire periphery by at least one conductive, in particular metallic, part of the corrosion element, in particular corrosion checking element.

Moreover, it is proposed that the corrosion checking element in an initial state has an outer cross section which is at least substantially identical to an outer cross section of a wire of a wire netting to be monitored in a delivery state of the wire netting. As a result, a reliable measurement variable for corrosion can advantageously be ascertained, which can be related in particular directly to the corrosion of the wire netting, in particular the corrosion of the anticorrosion protective layer of the wire netting. As a result, it is advantageously possible to achieve high safety for the wire netting to be monitored. In particular, as a result, at least substantially identical influences of a surface curvature and/or surface tension on corrosion of the corrosion checking element and the wire of the wire netting can advantageously be made possible. As a result, a better transferability of the measurement results from the corrosion checking element to the wire netting can advantageously be made possible. An "initial state" and/or a "delivery state" should be understood to mean, in particular, an uncorroded state. An "outer cross section" should be understood to mean, in particular, a contour of a cross section of an outermost layer delimiting the corrosion checking element and/or the wire in the radial direction, wherein the cross section is in particular perpendicular to a longitudinal direction of the corrosion checking element and/or of the wire.

It is proposed that the corrosion monitoring unit comprises at least one further corrosion checking element, with preference at least two further corrosion checking elements and preferably at least a plurality of further corrosion checking elements, wherein in particular the further corrosion checking element/s is/are embodied at least substantially identically to the corrosion checking element. As a result, redundancy can advantageously be increased, as a result of which in particular a durability and/or service life of the monitoring device can be increased. In addition, an accuracy and/or reliability, in particular of a measurement, of the corrosion indicator can advantageously be achieved, in particular by virtue of the fact that measurement values of different corrosion indicators can be compared. As a result of a comparison, in particular of the corrosion indicators of at least three corrosion elements, advantageously erroneous measurement values can be sorted out and deviations can be averaged out.

Furthermore, it is proposed that the at least one further corrosion checking element has a spatial orientation which is significantly different than a spatial orientation of the corrosion checking element, preferably at least substantially perpendicular to the spatial orientation of the corrosion checking element. As a result, as complete and/or precise monitoring of the wire netting as possible can advantageously be made possible, in particular by virtue of the fact that the monitoring is as independent of orientation as possible. In addition, it is advantageously possible to reduce an influence of an orientation of the monitoring device in the course of mounting. As a result, it is advantageously possible to achieve high safety for the wire netting to be monitored. It is conceivable for the spatial orientations of the corrosion checking elements to correspond to the prevailing spatial orientations of the net elements of a wire netting to be monitored; by way of example, in the case of a wire netting having rhombic meshes, the corrosion checking elements could be oriented parallel to the sides of the rhombi and/or, in the case of a wire netting having a helix, the corrosion checking elements could be oriented parallel to legs of the helix. The expression "substantially perpendicular" is intended here to define in particular an orientation of a direction relative to a reference direction, wherein the direction and the reference direction, in particular as viewed in a plane, form an angle of 90° and the angle has a maximum deviation of, in particular, less than 8°, advantageously less than 5° and particularly advantageously less than 2°.

Moreover, it is proposed that at least the corrosion monitoring unit, in particular at least the sensor unit, the data transfer module, the data logger module, the communication module and/or the correction module, is operable at least partly in a pulsed manner. As a result, energy-saving functioning can advantageously be obtained, as a result of which advantageously an energy stored in an energy source of the monitoring device can be utilized efficiently and/or long operation until exchange and/or charging of the energy source can be made possible. As a result, operation of the monitoring device that is as far as possible free of interference and/or free of interruption can advantageously be achieved. In addition, in particular in a comparison with continuous operation, electronic components and/or components configured for a current flow can be treated with care. Preferably, pulsed operation is carried out at periodic intervals, for example with a respective electrical pulse at an interval of a few minutes, hours, days and/or weeks. The energy source can comprise in particular at least one, preferably exchangeable, battery and/or preferably at least one rechargeable battery. In particular, the control and/or regulation unit is configured for operating in a pulsed manner at least the corrosion monitoring unit, in particular at least the sensor unit, the data transfer module, the data logger module, the communication module and/or the correction module. A "control and/or regulation unit" is in particular to mean a unit comprising at least one electronic control unit. An "electronic control unit" should be understood to mean, in particular, a unit comprising a processor unit and comprising a storage unit and also comprising an operating program stored in the storage unit.

Advantageously, the monitoring device comprises at least one photovoltaic unit. As a result, an autonomous energy supply can advantageously be made possible. Preferably, the photovoltaic unit is configured for charging the rechargeable battery. In particular, the photovoltaic unit comprises at least one solar panel having at least one solar cell for generating voltage by means of absorbed sunlight. Advantageously, besides the rechargeable battery that is chargeable by the photovoltaic unit, the monitoring device comprises a further energy source, for example a battery, which serves for supplying energy during times at which the rechargeable battery is discharged, for example in the case where the solar panel is at least partially covered, for example by snow, and can generate no or too little current.

Moreover, it is proposed that the corrosion monitoring unit is configured for monitoring at least one further corrosion indicator different than the corrosion indicator. As a result, a reliability and/or accuracy of the monitoring device, in particular of the determination of the corrosion by the monitoring device, can advantageously be increased further, as a result of which it is advantageously possible to achieve high safety for the wire netting to be monitored. Advantageously, a functionality of the monitoring device can be monitored as a result, for example by an automatic warning message being communicated to an operator in the event of a divergence of two monitored corrosion indicators. The further corrosion indicator comprises in particular at least one corrosion-influenceable property, in particular material property and/or material constitution, in particular of at least one part of the wire netting and/or at least one part of an element which is embodied separately from the wire netting and which is indicative of corrosion of the wire netting and/or is exposed preferably to ambient and/or weather conditions which are at least substantially identical to those to which the wire netting is exposed. Preferably, a status, an intensity and/or a progress of corrosion, in particular of at least one part of the wire netting, is determinable by means of the corrosion indicator. The corrosion indicator comprises in particular at least one surface coloration, at least one surface constitution, at least one loss of weight, at least one tear resistance, at least one oscillation frequency, in particular resonant oscillation frequency, an electrical conductivity, an ohmic resistance of at least one part of the wire of the wire netting and/or of at least one part of the element embodied separately from the wire netting, a current flow between two electrodes of the ACM sensor and/or preferably at least one surface coloration of the corrosion element. The corrosion monitoring unit is configured in particular for registering and/or preferably for sensing the corrosion indicator and in particular making it accessible to a user and/or automatically comparing it with a database for the purpose of estimating a state, a functionality and/or safety of the wire netting. By way of example, it is conceivable for the further corrosion indicator to be a coloration of the wire of the wire netting to be monitored which is determinable by means of a photograph recorded by a camera of the monitoring device, which photograph is recorded regularly, for example weekly, and is sent to a person entrusted with the monitoring and/or is sent to a data collection drone flying toward at least one corrosion monitoring unit, preferably at least a plurality of corrosion monitoring units, upon contact being made.

Furthermore, it is proposed that the corrosion monitoring unit comprises at least one environment sensor unit configured for monitoring at least one ambient and/or weather parameter. As a result, a corrosion, in particular a progress of corrosion, can advantageously be related to ambient and/or weather conditions, as a result of which for example a location-dependent prognosis for corrosion can be made. In addition, a future adaptation of a wire netting and/or of anticorrosion protection of a wire netting to specific conditions to be expected at a location can advantageously be made possible by means of the data collected. The environment sensor unit comprises in particular at least one weather station, at least one gas sensor, at least one particle sensor and/or at least one radiation sensor. An "ambient and/or weather parameter" should be understood to mean, in particular, at least one air temperature, at least one air humidity, at least one wind direction, at least one wind speed, at least one amount of precipitation, at least one insolation intensity, at least one fine dust concentration and/or at least one concentration of at least one atmospheric gas, for example $O_3$, $SO_x$ and/or $NO_x$. Preferably, the data logger module is configured at least for recording measured ambient and/or weather parameters in a time series. Preferably, the data transfer module is configured at least for outputting ambient and/or weather parameters ascertained. Preferably, the communication module is configured at least for communicating ambient and/or weather parameters to an external receiver, in particular in an automated manner and/or periodically.

In addition, it is proposed that the corrosion monitoring unit comprises at least one impact sensor unit configured for sensing impacts of dynamic impact bodies into a wire netting to be monitored. As a result, an estimation of a durability of the wire netting can advantageously be improved, in particular since wire nettings already previously burdened by impacts already offer possibly impaired protection even in the case of relatively low corrosion. By way of example, an anticorrosion protective coating may be damaged locally in the event of an impact of a dynamic impact body, as a result of which locally corrosion progresses faster than at a location monitored by the monitoring unit. By means of the impact sensor unit, it is thus advantageously possible to achieve high safety for the wire netting to be monitored. Preferably, the impact sensor unit comprises at least one acceleration sensor configured for detecting at least one characteristic variable for an acceleration occurring at the wire netting, in particular at a rope and/or mesh construction comprising the wire netting, in the event of an impact of an impact body into the wire netting. Preferably, the acceleration sensor is configured at least for measuring accelerations of at least up to 100 g, preferably at least up to 150 g and preferably at least up to 200 g, wherein 1 g corresponds to a value of 9.81 m/s$^2$. Preferably, a function of the acceleration sensor is independent of ropes and/or ropes running outside a housing unit of the monitoring device. Preferably, the acceleration sensor monitors accelerations occurring at support ropes of the rope and/or mesh construction comprising the wire netting. Preferably, the data logger module is configured at least for recording measured accelerations in a time series. Preferably, the data transfer module is configured at least for outputting accelerations ascertained. Preferably, the communication module is configured at least for communicating acceleration data to an external receiver, in particular in an automated manner. In particular, the acceleration sensor has an activation function which switches the acceleration sensor from a rest state to an active state in an automated manner, in particular when an acceleration value occurs which is above an acceleration value forming an activation threshold.

Furthermore, a monitoring system having a plurality of monitoring devices is proposed. As a result, it is advantageously possible to achieve high safety for the wire netting to be monitored. The plurality of monitoring devices can be arranged in particular at least partly at an individual and/or continuous wire netting and/or preferably at least partly at different, in particular spatially adjacent, wire nettings. In addition, it is conceivable for the monitoring system to comprise a plurality of monitoring devices assigned at least partly to wire nettings distributed at different locations. As a result, an overview of wire nettings of an operator can advantageously be made possible.

If the monitoring devices are networked, in particular by means of a communication module of a corrosion monitoring unit, an overview of wire nettings of an operator can advantageously be made possible. As a result, a clarity and/or an efficiency can advantageously be increased. In particular, the monitoring devices are internetworked and/or interconnected via a local and/or central hub. The local hub is arranged in particular in spatial proximity to the networked monitoring devices and forms a local node. "Spatial proximity" should be understood to mean, in particular, a distance of at most a few kilometers, preferably of at most a few hundred meters. The central hub is embodied in particular as a spatially remote server, for example a network and/or internet server, which can be stipulated in particular worldwide.

Furthermore, what is proposed is a system for monitoring corrosion of a wire netting having at least one monitoring device and having at least one wire netting, in particular protective net for stabilizing, catching and/or intercepting and/or retaining heavy loads, preferably having a monitoring system. As a result, it is possible to provide in particular advantageous properties, in particular of the wire netting, with regard to safety. Advantageously, a protective effect and/or a durability of a wire netting, in particular of a wire netting installation, can be monitored, as a result of which in particular malfunctions can be avoided.

In addition, it is proposed that the wire netting comprises at least one indicator element which at least partly forms a corrosion element that is to be monitored directly. As a result, it is advantageously possible to achieve a direct monitoring possibility for the wire netting independently of a corrosion checking element, as a result of which a complexity can advantageously be reduced. In particular, the indicator element is embodied integrally with at least one net element of the wire netting. A "corrosion element that is to be monitored directly" is in particular to mean a corrosion element that is to be monitored which is in touching contact with a contacting unit of the corrosion monitoring unit for the purpose of corrosion monitoring. "Integrally" should be understood to mean, in particular, cohesively connected, such as, for example, by means of a welding process and/or adhesive-bonding process, etc., and particularly advantageously integrally molded, such as by means of production by being molded in one piece and/or by means of production in a single- or multi-component injection molding method. Advantageously, integrally should also be understood to mean in one piece. The corrosion element could preferably at least partly form a wire netting and be configured in particular for stabilizing, in particular static constructions, and/or for catching and/or intercepting and/or retaining heavy loads. It is conceivable for the corrosion element to have a, for example color, marking, which functions in particular as an identification feature for a fitter. The fitter then advantageously identifies a mounting site configured for the monitoring device on the wire netting in a simple manner.

Furthermore, it is proposed that the indicator element is embodied as a net element interwoven in the wire netting. As a result, it is advantageously possible to achieve a direct monitoring possibility for the wire netting independently of a corrosion checking element, as a result of which a complexity can advantageously be reduced.

Furthermore, what is proposed is a method for monitoring corrosion of a wire netting, in particular of a protective net for stabilizing, catching and/or intercepting and/or retaining heavy loads, in particular by means of a monitoring device, having at least two inter-engaging net elements, at least one net element of which is produced from at least one single wire, a wire bundle, a wire strand, a wire rope and/or some other longitudinal element having at least one wire, in particular produced from a high-tensile steel, wherein at least one corrosion indicator is monitored. As a result, it is possible to provide in particular advantageous properties, in particular of the wire netting, with regard to safety. Advantageously, a protective effect and/or a durability of a wire netting, in particular of a wire netting installation, can be monitored, as a result of which in particular malfunctions can be avoided.

Moreover, it is proposed that at least an intensity of corrosion is determined by means of a current value of a current flow. As a result, it is advantageously possible to ascertain a reliable measurement variable, in particular proportional to a material erosion rate, for corrosion. As a result, it is advantageously possible to achieve high safety for the wire netting to be monitored.

It is additionally proposed that at least a progress of corrosion is determined by means of a change, in particular a rise, in an electrical resistance and/or a change, in particular a fall, in an electrical conductivity. As a result, it is advantageously possible to ascertain a reliable measurement variable for corrosion. As a result, it is advantageously possible to achieve high safety for the wire netting to be monitored. Furthermore, it is proposed that an automatic notification, in particular automatic warning message, is triggered, in particular is sent by means of a notification module, in the event of a threshold value of the corrosion indicator, embodied in particular as an electrical resistance, at an electrical conductivity, as a current flow, being exceeded, undershot and/or reached. As a result, user-friendliness can advantageously be increased further, in particular by virtue of the fact that up-to-date information is made available to a remote user at any time. In addition, it is advantageously possible to achieve safety of the wire netting to be monitored, in particular by virtue of the fact that a corrosion impairment of a wire netting can be indicated to a responsible person in a timely manner. A "threshold value" is embodied in particular as a minimum acceptable conductivity, as a maximum acceptable electrical resistance, as a maximum change in the conductivity and/or in the electrical resistance and/or as an absence of a current flow, in particular despite moist ambient conditions, and/or as a time duration of an absence of a current flow.

The monitoring device according to the invention and/or the method according to the invention is/are not intended to be restricted here to the application and embodiment described above. In particular, the monitoring device according to the invention and/or the method according to the invention, in order to fulfill a functioning described herein, can have a number of individual elements, components and units deviating from a number mentioned herein.

DRAWINGS

Further advantages will become apparent from the following description of the drawings. Two exemplary embodiments of the invention are illustrated in the drawings. The drawings, the description and the claims contain numerous features in combination. The person skilled in the art will expediently also consider the features individually and combine them to form expedient further combinations.

Figure 2:
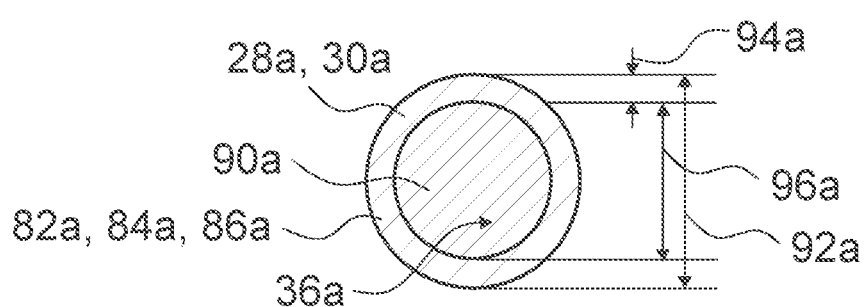
Figure 3:
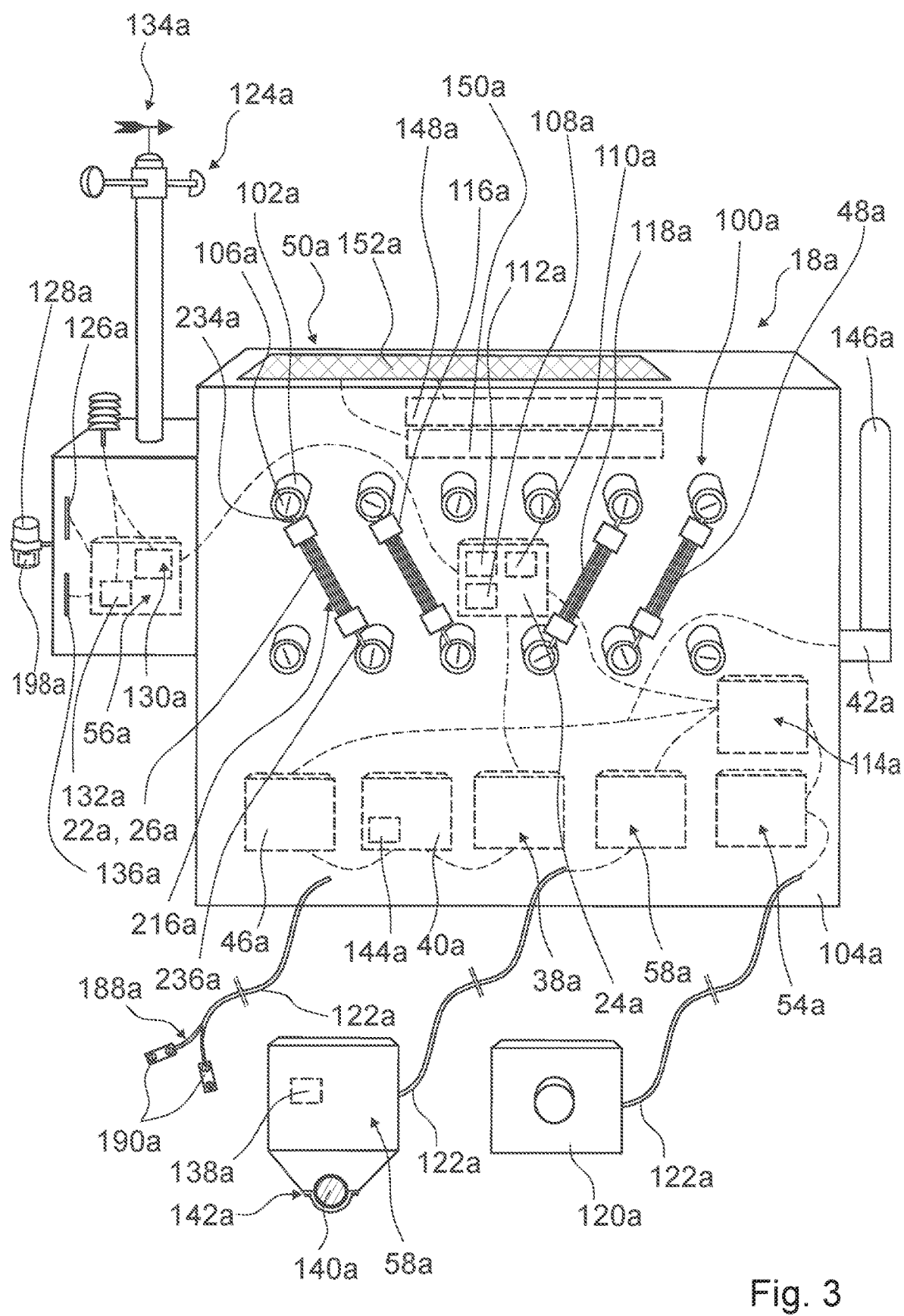
Figure 5A:
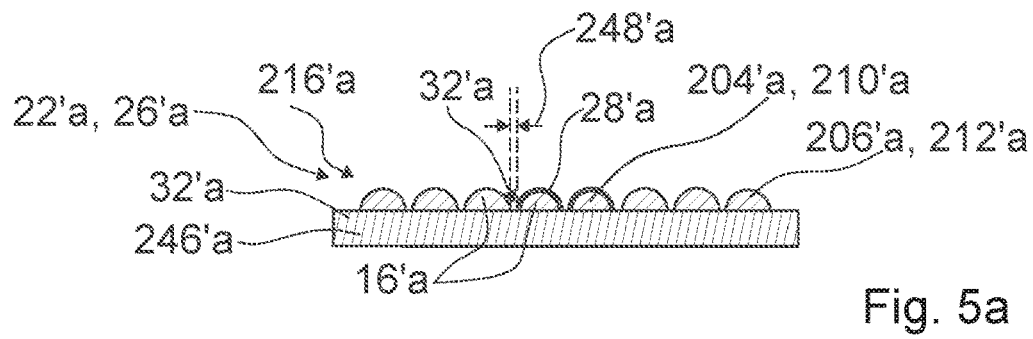
Figure 5B:
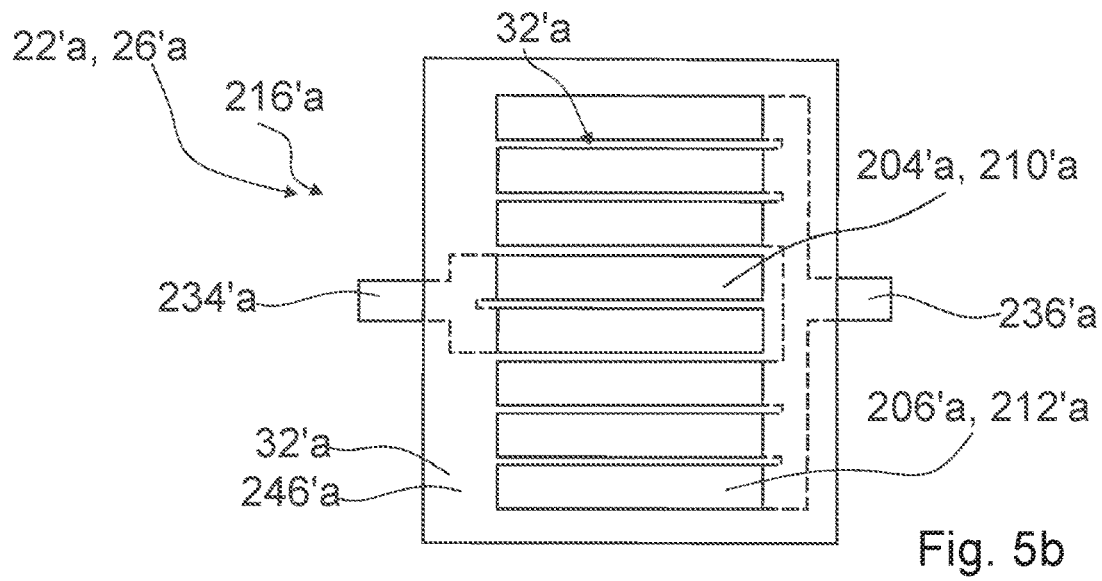
Figure 6:
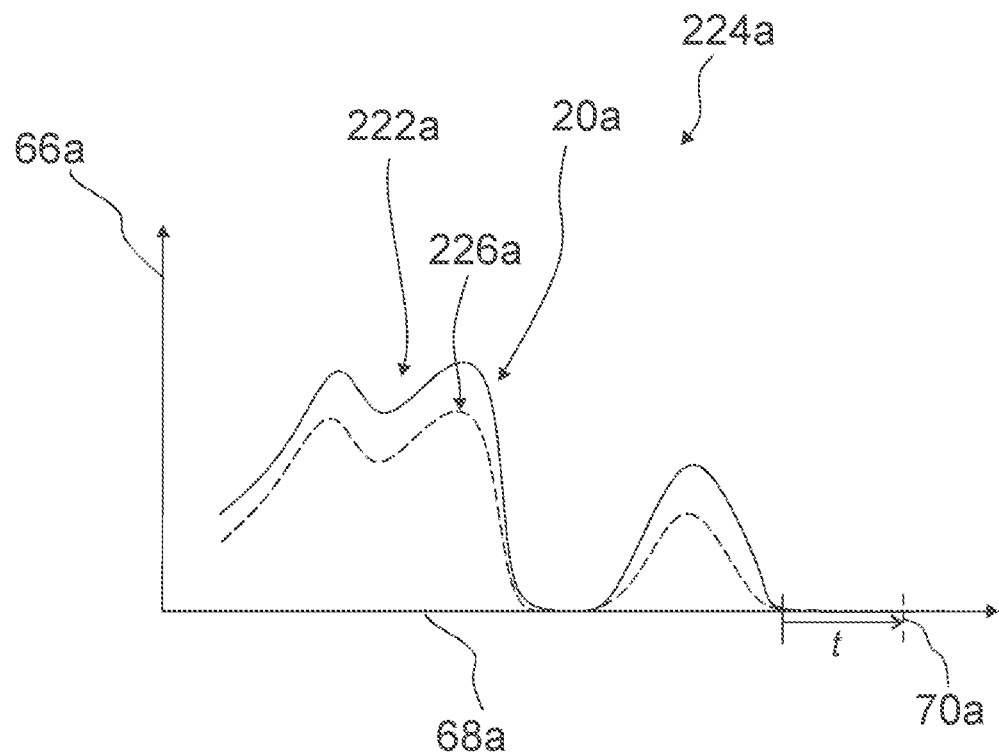
Figure 7:
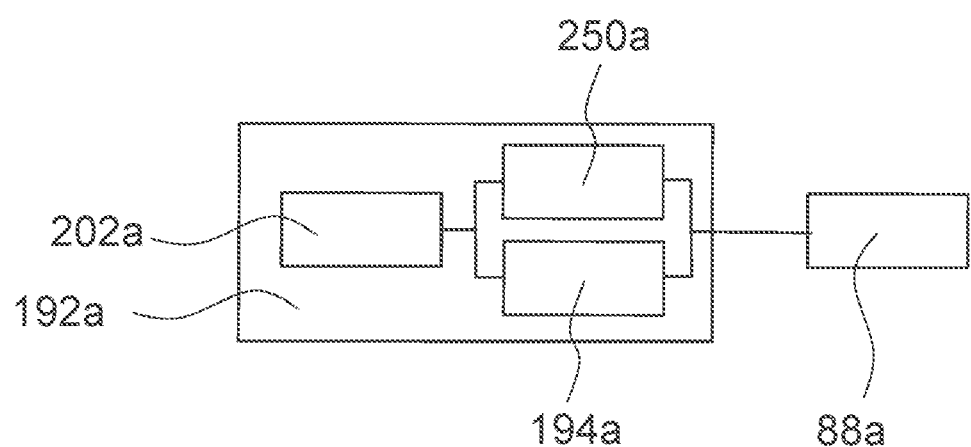
Figure 8:
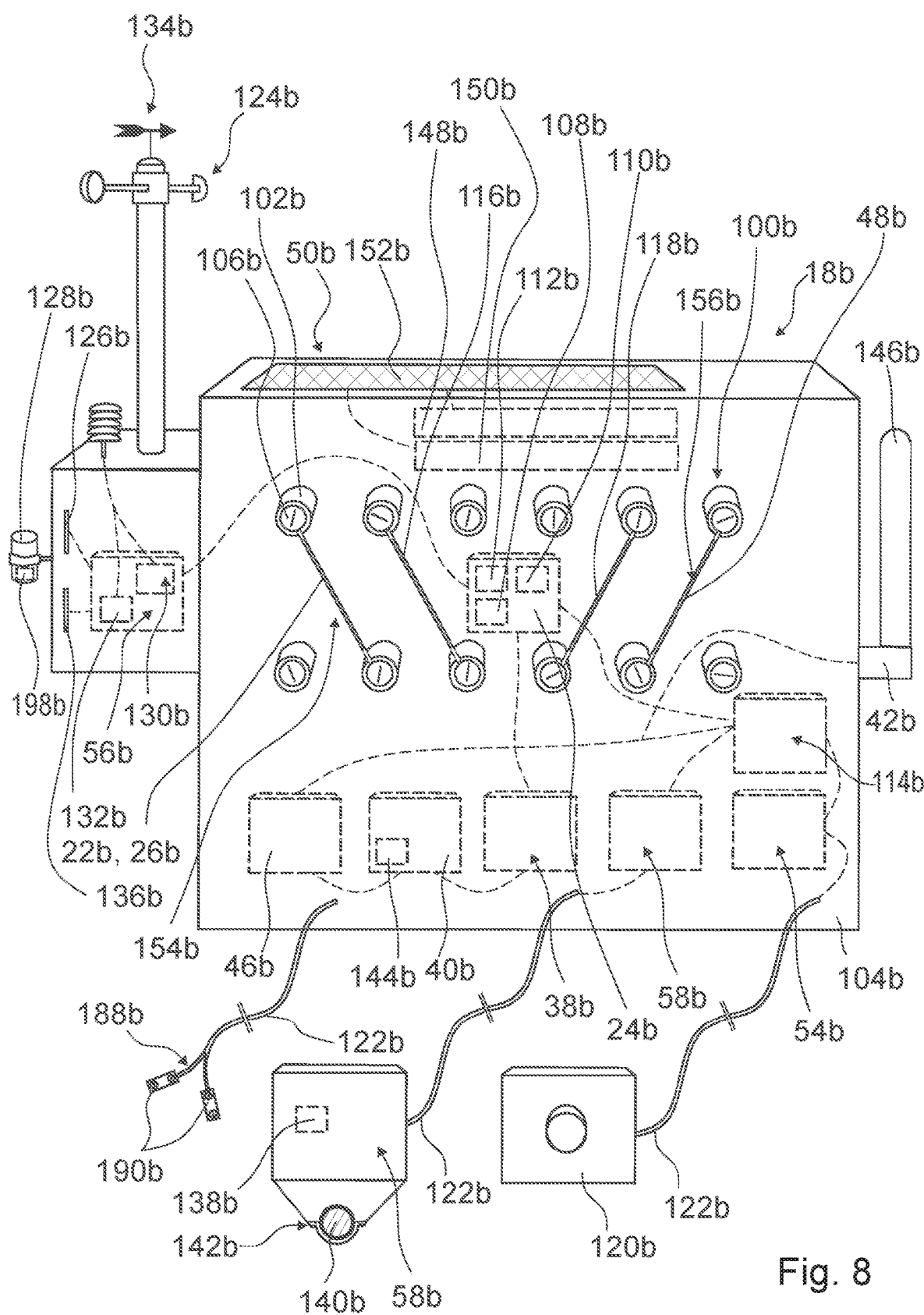
Figure 9:
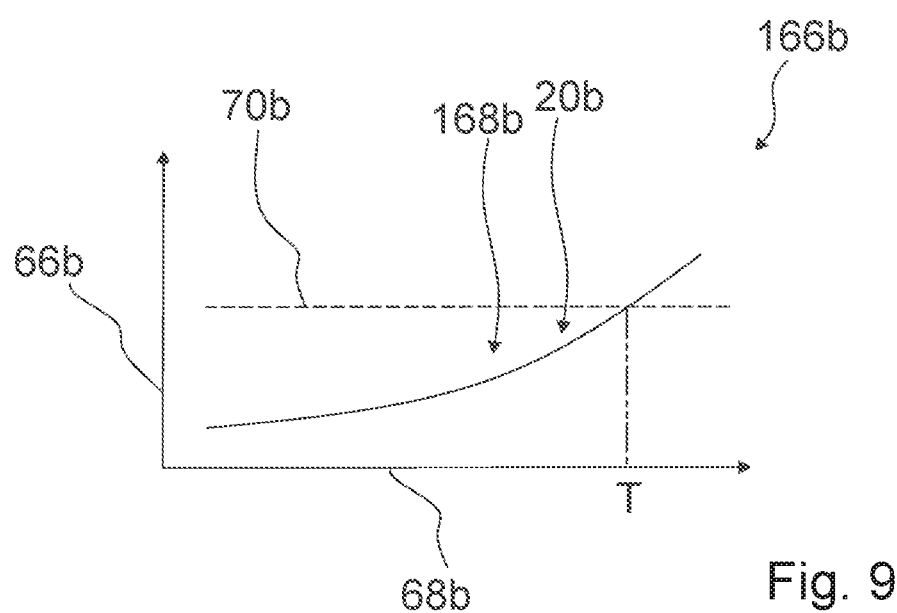
Figure 10:
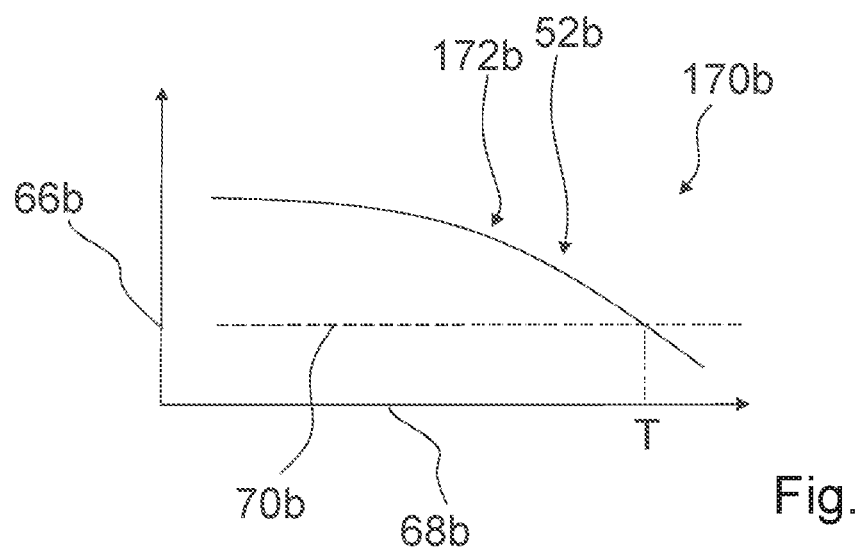
Figure 11:
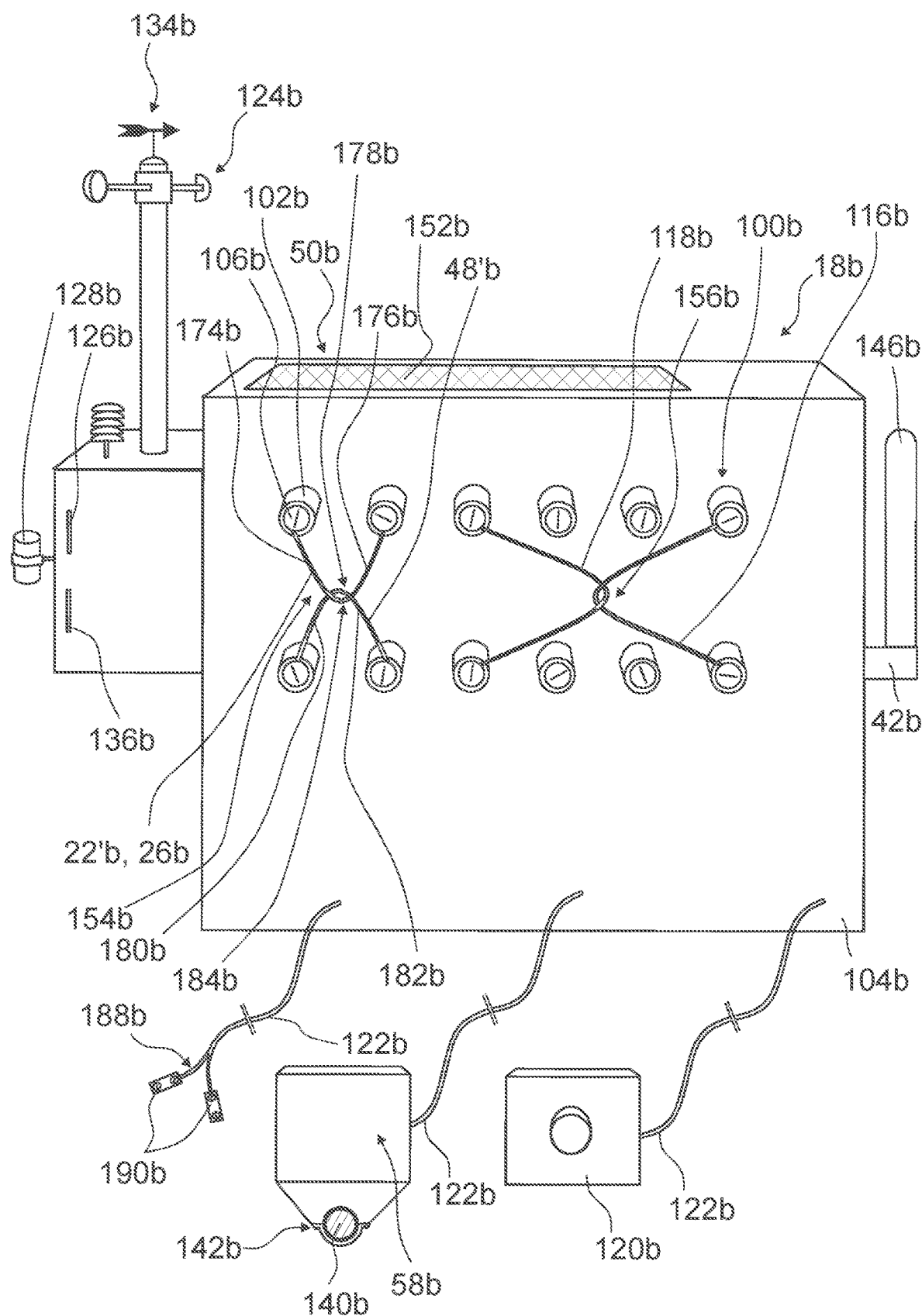
Figure 12:
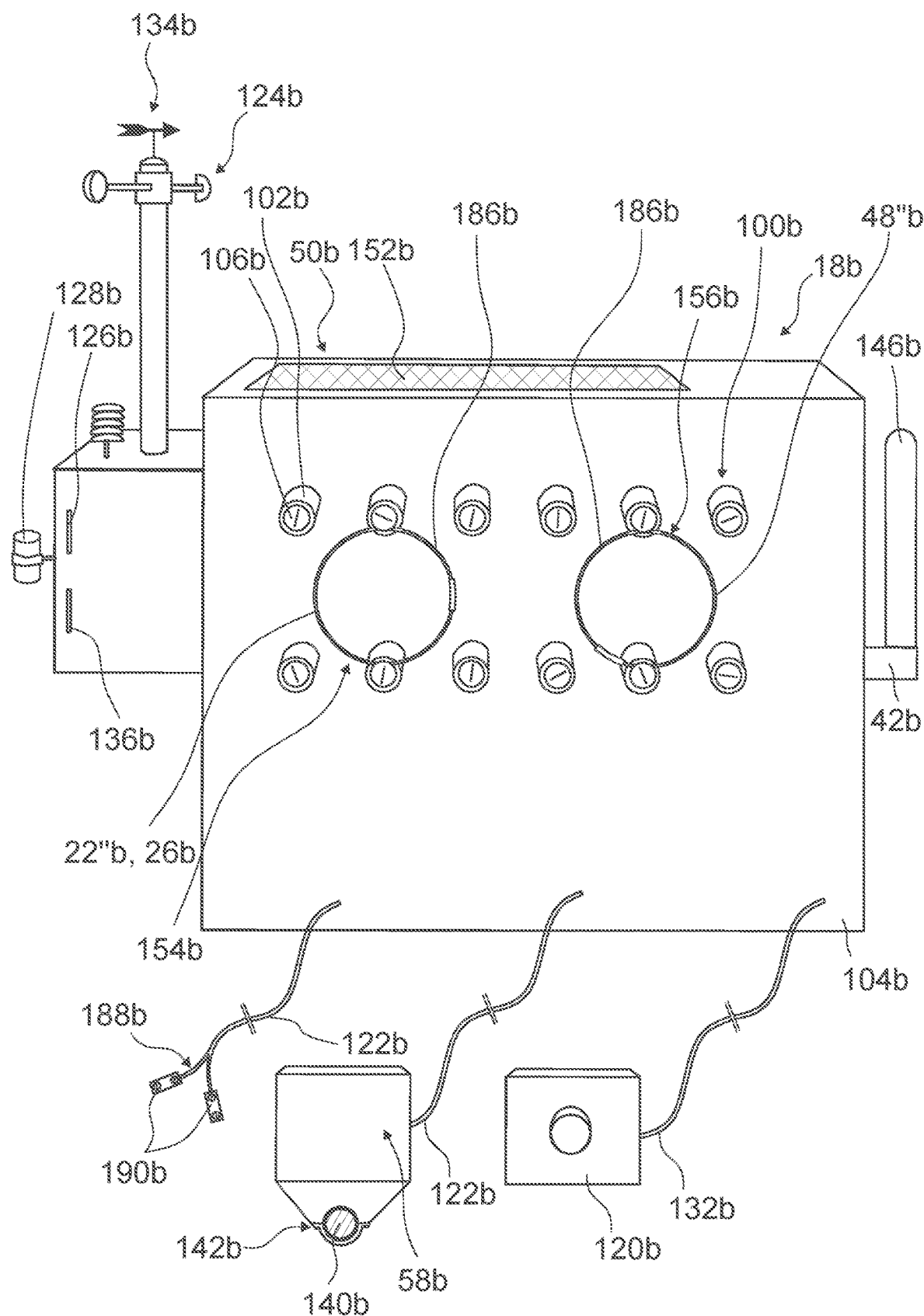
Figure 13:
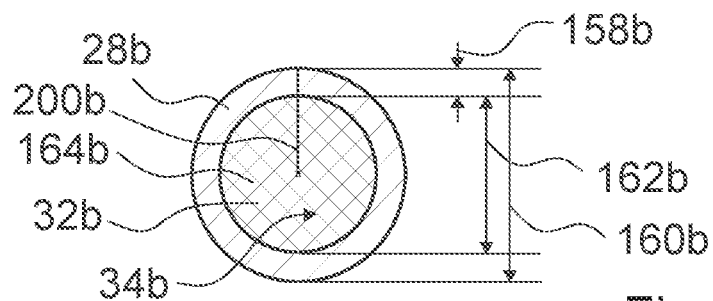
Figure 14:
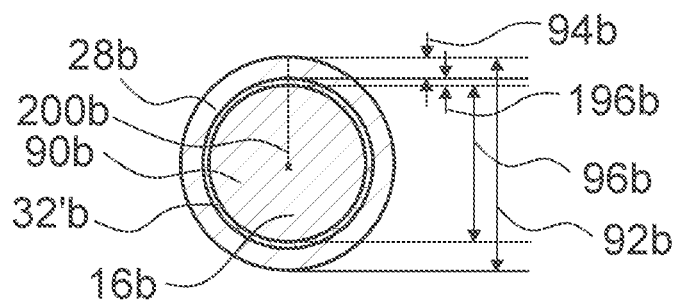
Figure 15:
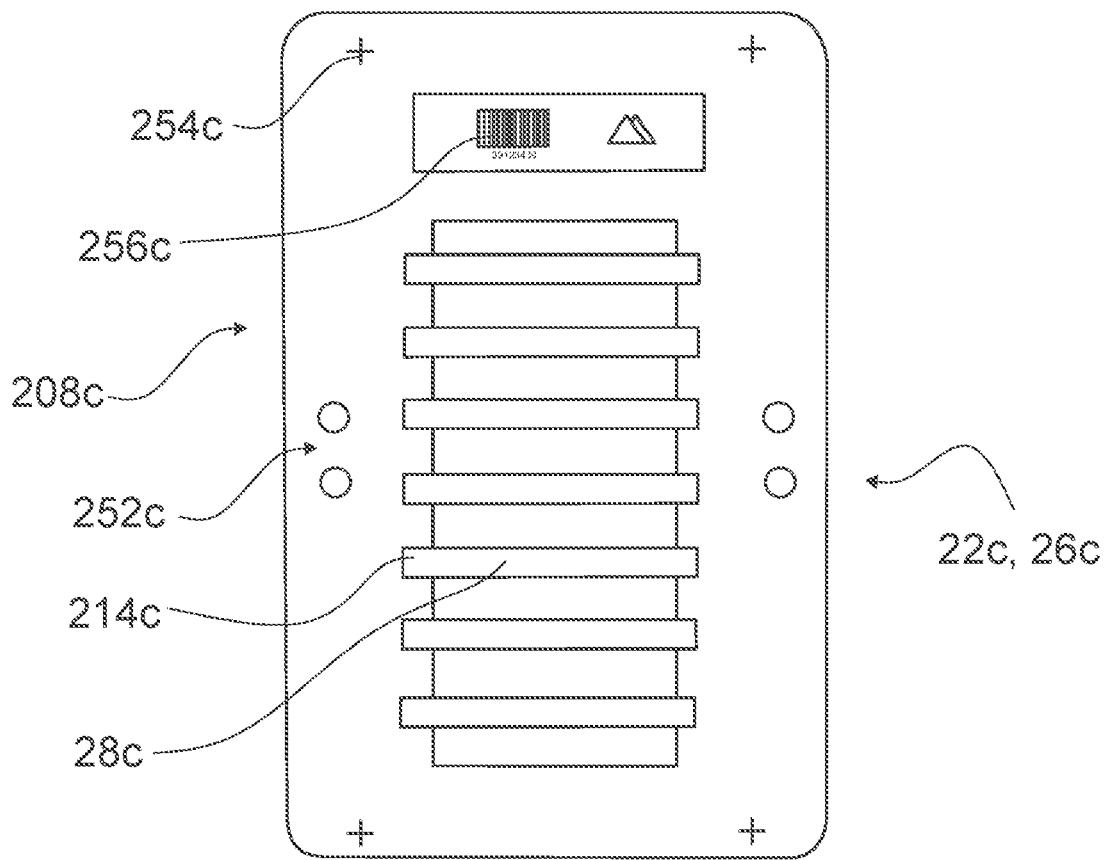
Figure 16:
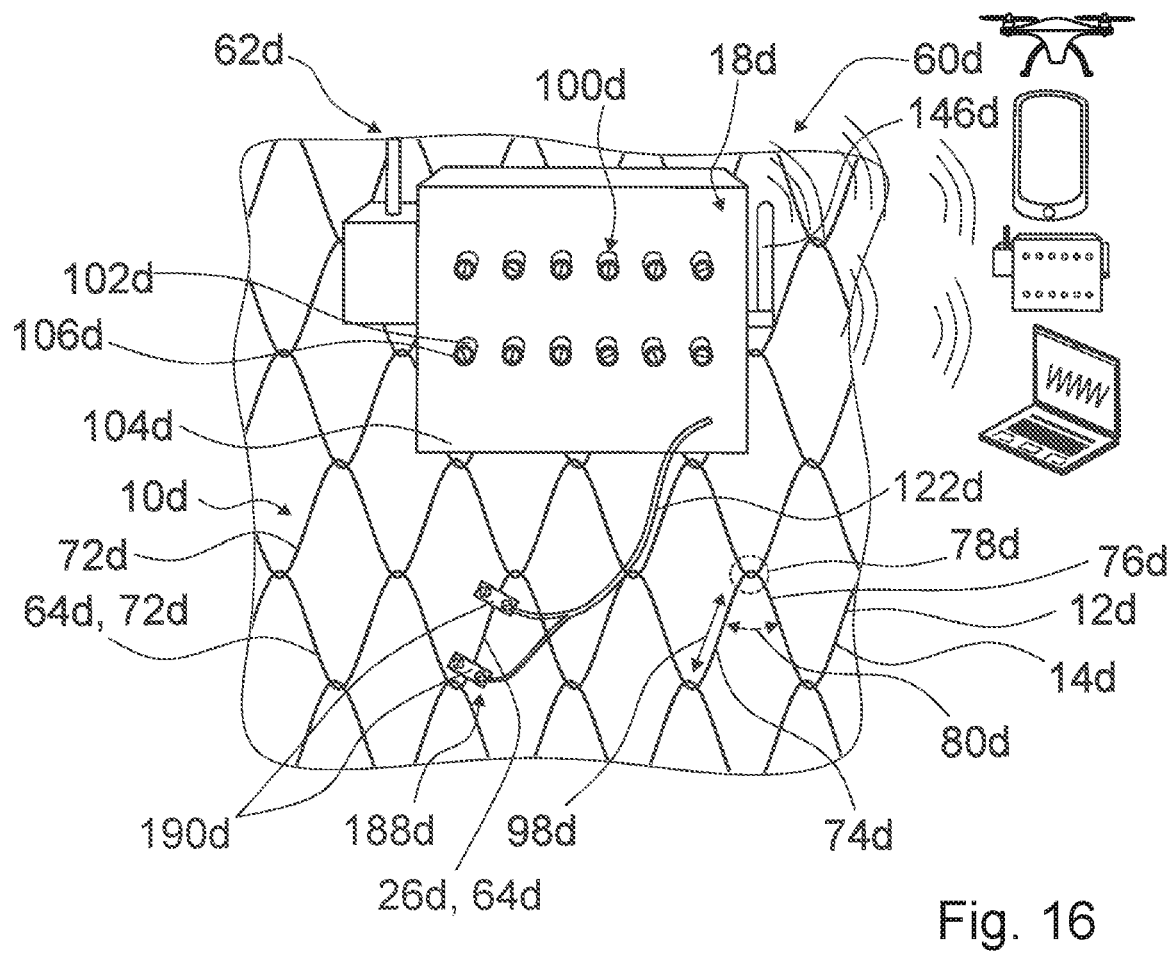

In the figures:

FIG. 1 shows a system for monitoring corrosion having a wire netting and a monitoring device, FIG. 2 shows a cross section of a wire of the wire netting, FIG. 3 shows a corrosion monitoring unit of the monitoring device having corrosion checking elements, FIG. 4 shows a) a cross section of the corrosion checking element, b) a side view of the corrosion checking element, FIG. 5 shows a) a cross section of an alternative corrosion checking element, b) a side view of the alternative corrosion checking element, FIG. 6 shows a current-time diagram, FIG. 7 shows a flow diagram for a method, FIG. 8 shows an alternative corrosion monitoring unit having further alternative corrosion checking elements, FIG. 9 shows a resistance-time diagram, FIG. 10 shows a conductivity-time diagram, FIG. 11 shows the alternative corrosion monitoring unit having a second further alternative corrosion checking element, FIG. 12 shows the alternative corrosion monitoring unit having a third further alternative corrosion checking element, FIG. 13 shows a cross section of a corrosion element, FIG. 14 shows a cross section of an alternative corrosion element, FIG. 15 shows a fourth further alternative corrosion checking element, and FIG. 16 shows an alternative system for monitoring corrosion having a wire netting and a monitoring device.

DESCRIPTION OF THE EXEMPLARY EMBODIMENTS

FIG. 1 shows a system 62a for monitoring corrosion of a wire netting 10a. The system 62a comprises a monitoring device. The system 62a comprises a wire netting 10a. The wire netting 10a is embodied as a protective net for catching and/or intercepting heavy loads. Alternatively or additionally, the wire netting 10a can be embodied as a protective net for retaining heavy loads, for example for slope stabilization. Alternatively or additionally, the wire netting 10a can be embodied as a protective net for stabilizing, in particular static constructions and/or heavy loads. The wire netting 10a is formed from inter-engaging net elements 12a. The net element 12a is produced from a wire 14a. The wire 14a is produced from a high-tensile steel 16a. Alternatively, the net element 12a can be produced as a wire bundle, as a wire strand, as a wire rope and/or as some other longitudinal element having the wire 14a. The net element 12a is embodied as a helix 72a. The helices 72a have two legs 74a, 76a arranged alternately. The legs 74a, 76a are connected to one another at a bending region 78a. The legs 74a, 76a span an angle 80a at the bending region 78a. Alternatively, the net element 12a can be embodied such that it is closed on itself, for example ring-shaped.

The net element 12a has an anticorrosion protection 82a. The anticorrosion protection 82a is embodied as a coating 28a of the net element 12a. The anticorrosion protection 82a is embodied as an anticorrosion protective coating 30a (cf. FIG. 2). The anticorrosion protective coating 30a is embodied as a metallic coating 84a of the wire 14a. The metallic coating 84a is embodied as a zinc coating 86a. Alternatively, the metallic coating 84a can be embodied as a zinc-aluminum coating. The wire 14a comprises a wire core 90a. The anticorrosion protective coating 30a is applied in a manner adhering on the wire core 90a. The wire core 90a is formed from a high-tensile steel 16a. The wire core 90a has a diameter 96a. The wire 14a has an outer cross section 36a. The outer cross section 36a is embodied as a cross section of the wire 14a perpendicular to a direction of longitudinal extent 98a of the wire 14a, in particular of a leg 74a, 76a. The wire 14a has a total diameter 92a. The outer cross section 36a comprises a total diameter 92a of the wire 14a. The outer cross section 36a comprises the diameter 96a of the wire core 90a. The coating 28a has a layer thickness 94a. The outer cross section 36a comprises the layer thickness 94a of the coating 28a, in particular of the anticorrosion protective coating 30a, of the wire 14a.

The system 62a comprises a monitoring system 60a (cf. FIG. 1). The monitoring system 60a comprises a plurality of monitoring devices. The monitoring system 60a comprises a plurality of corrosion monitoring units 18a. A corrosion monitoring unit 18a is configured for monitoring at least one corrosion indicator 20a (cf. FIG. 6). The corrosion indicator 20a is embodied as a current flow. The corrosion monitoring unit 18a is configured for monitoring a corrosion element 26a, in particular corrosion indicators 20a of the corrosion element 26a.

The plurality of monitoring devices can be assigned at least partly to the same wire netting 10a or to different wire nettings 10a. The plurality of corrosion monitoring units 18a can be arranged at least partly on the same wire netting 10a or on different wire nettings 10a. The monitoring devices are networked. The networking of the monitoring devices is wireless. The corrosion monitoring unit 18a is able to be networked with further corrosion monitoring units 18a. Alternatively or additionally, the corrosion monitoring unit 18a is able to be networked with further devices, for example with at least one smartphone 228a, at least one tablet, at least one drone 230a and/or at least one Internet-enabled device 232a, for example an Internet server and/or a further external receiver 44a. The networking of the corrosion monitoring unit 18a is wireless.

The corrosion monitoring unit 18a is arranged on the wire netting 10a. The corrosion monitoring unit 18a is secured directly to the wire netting 10a. The corrosion monitoring unit 18a contacts the wire netting 10a. The corrosion monitoring unit 18a comprises a securing unit (not shown) configured for securing the corrosion monitoring unit 18a to the wire netting 10a and relative to the wire netting 10a.

The corrosion monitoring unit 18a comprises a corrosion checking element 22a. The corrosion checking element 22a is configured for supplying at least partial information for determining the corrosion indicator 20a. The corrosion checking element 22a is embodied as an ACM (Atmospheric Corrosion Monitor) sensor 216a. The corrosion monitoring unit 18a comprises at least one further corrosion checking element 48a. The further corrosion checking element 48a is embodied at least substantially identically to the corrosion checking element 22a. The further corrosion checking element 48a is embodied as an ACM (Atmospheric Corrosion Monitor) sensor 216a. The further corrosion checking element 48a has a spatial orientation that is significantly different than a spatial orientation of the corrosion checking element 22a. Moreover, the corrosion monitoring unit 18a comprises additional further corrosion checking elements 116a, 118a. The additional further corrosion checking elements 116a, 118a are embodied at least substantially identically to the corrosion checking element 22a. The additional further corrosion checking element 116a has an orientation that is at least substantially identical to that of the corrosion checking element 22a. The additional further corrosion checking element 118a has an orientation that is at least substantially identical to that of the further corrosion checking element 48a.

The corrosion monitoring unit 18a comprises a holding unit 100a. The holding unit 100a is configured for mounting the corrosion checking element 22a, 48a on the corrosion monitoring unit 18a. The holding unit 100a is configured for mounting the corrosion checking element 22a, 48a relative to the corrosion monitoring unit 18a. The holding unit 100a comprises a plurality of holders 102a. The holders 102a are embodied as holding clamps 106a. The holders 102a contact the corrosion checking element 22a, 48a at least electrically. For this purpose, by way of example, a contact element 234a, 236a of a corrosion checking element 22a, 48a is brought into the region of a loosened holding clamp 106a and secured by the tightening of a screw. The holders 102a are embodied in a manner raised from a base body 104a of the corrosion monitoring unit 18a. As a result, an influence of the corrosion monitoring unit 18a on corrosion of a mounted corrosion checking element 22a, 48a, for example as a result of shading, can advantageously be reduced. It is conceivable for the holders 102a to mount the corrosion checking element 22a, 48a further away from the base body 104 of the corrosion monitoring unit 18a than in the exemplary embodiment shown in FIG. 3 in order to further reduce an influence of the corrosion monitoring unit 18a on corrosion of a mounted corrosion checking element 22a, 48a. By way of example, a holding unit 100a and/or holder 102a capable of being secured to the wire netting 10a separately is conceivable for this purpose.

The corrosion monitoring unit 18a comprises an electrical sensor unit 24a (cf. FIG. 3). The electrical sensor unit 24a is configured for monitoring the corrosion indicator 20a. The electrical sensor unit 24a comprises a voltmeter 108a. The voltmeter 108a is configured for measuring a voltage present at the corrosion checking element 22a, 48a. The electrical sensor unit 24a comprises an ammeter 110a. The ammeter 110a is configured for measuring a current flow through the corrosion checking element 22a, 48a and/or within the corrosion checking element 22a, 48a. The ammeter 110a is embodied as a zero-resistance ammeter. The ammeter 110a is configured for measuring a galvanic current of the ACM sensor 216a.

The electrical sensor unit 24a comprises a current and/or voltage generating module 112a. The current and/or voltage generating module 112a is configured for applying a current and/or a voltage to the corrosion checking element 22a, 48a. The corrosion monitoring unit 18a is operable at least partly in a pulsed manner. The current and/or voltage generating module 112a is operable in a pulsed manner. The corrosion monitoring unit 18a comprises a control and/or regulation unit 114a. The control and/or regulation unit 114a is operable in a pulsed manner. The control and/or regulation unit 114a is configured for closed-loop control of the pulsed operation of the corrosion monitoring unit 18a and/or the components thereof.

The corrosion monitoring unit 18a is configured for monitoring at least one, further corrosion indicator 52a. The further corrosion indicator 52a is different than the corrosion indicator 20a. In the exemplary embodiment shown, the further corrosion indicator 52a is embodied as an at least partial surface discoloration of a corrosion element 26a and/or of a corrosion checking element 22a, 48a. The surface discoloration comprises a rust red coloration of the corrosion element 26a and/or of the corrosion checking element 22a, 48a. Alternatively, the further corrosion indicator 52a comprises a surface discoloration of at least one part of the wire netting 10a to be monitored. The monitoring of the further corrosion indicator 52a serves predominantly for checking a plausibility of the measurement results of the corrosion indicator 20a.

The corrosion monitoring unit 18a comprises at least one further electrical sensor unit 54a. The further electrical sensor unit 54a is configured for monitoring the further corrosion indicator 52a. A detection method of the further electrical sensor unit 54a is different than a detection method of the electrical sensor unit 24a. The detection method of the further electrical sensor unit 54a comprises a visual detection of a surface of a corrosion element 26a. The further electrical sensor unit 54a comprises a camera 120a. The control and/or regulation unit 114a is configured for carrying out a color and/or image identification of the images recorded by means of the camera 120a. The data transfer module 38a is configured for outputting images recorded by the further electrical sensor unit 54a and/or data acquired by the control and/or regulation unit 114a on the basis of images. The further electrical sensor unit 54a is operable in a pulsed manner. By way of example, the camera 120a captures an image every one to two weeks. The camera 120a is connected to the base body 104a by means of a cable connection 122a. Alternatively it is conceivable for the camera 120a to communicate wirelessly with the corrosion monitoring unit 18a, in particular the control and/or regulation unit 114a and/or a data transfer module 38a of the corrosion monitoring unit 18a.

The corrosion monitoring unit 18a comprises an environment sensor unit 56a. The environment sensor unit 56a is configured for monitoring at least one ambient and/or weather parameter. The environment sensor unit 56a comprises an anemometer 124a. The anemometer 124a is configured for measuring a wind speed. The environment sensor unit 56a comprises a thermometer 126a. The thermometer 126a is configured for measuring an ambient temperature. The environment sensor unit 56a comprises a precipitation measuring unit 128a. The precipitation measuring unit 128a is configured for measuring an amount of precipitation. It is conceivable for the precipitation measuring unit 128a to comprise an acidimeter 198a for determining a pH of precipitation. The environment sensor unit 56a comprises a fine dust measuring unit 130a. The fine dust measuring unit 130a is configured for measuring a fine dust concentration, in particular $PM_{10}$. The environment sensor unit 56a comprises a gas measuring unit 132a. The gas measuring unit 132a is configured for measuring a gas concentration, in particular $SO_x$, $NO_x$ and/or $O_3$. The environment sensor unit 56a comprises a wind direction measuring unit 134a. The wind direction measuring unit 134a is configured for measuring a wind direction. The environment sensor unit 56a comprises a hydrometer 136a. The hydrometer 136a is configured for measuring a relative air humidity. The data transfer module 38a is configured for outputting data recorded by the environment sensor unit 56a. The environment sensor unit 56a is operable in a pulsed manner. By way of example, the environment sensor unit 56a detects a respective ambient parameter every 1 to 24 hours. The environment sensor unit 56a is fixedly connected to the base body 104a. Alternatively, it is conceivable for the environment sensor unit 56a to communicate wirelessly with the corrosion monitoring unit 18a, in particular the control and/or regulation unit 114a and/or the data transfer module 38a.

The corrosion monitoring unit 18a comprises at least one impact sensor unit 58a. The impact sensor unit 58a is configured for sensing impacts of dynamic impact bodies into a wire netting 10a to be monitored. The impact sensor unit 58a comprises at least one acceleration sensor 138a. The acceleration sensor 138a is configured for detecting accelerations that occur in the event of a dynamic impact body. The impact sensor unit 58a is configured for mounting on a support rope 140a that supports the wire netting 10a. The impact sensor unit 58a comprises a mounting element 142a. The mounting element 142a is configured for enclosing the support rope 140a that supports the wire netting 10a in a circumferential direction. The impact sensor unit 58a is configured for detecting movements, in particular accelerations, of the support rope 140a that supports the wire netting 10a. The data transfer module 38a is configured for outputting data recorded by the impact sensor unit 58a. The impact sensor unit 58a is fixedly connected to the base body 104a by means of a cable connection 122a. Alternatively, it is conceivable for the impact sensor unit 58a to communicate wirelessly with the corrosion monitoring unit 18a, in particular the control and/or regulation unit 114a and/or the data transfer module 38a.

The data transfer module 38a is configured for outputting a corrosion indicator 20a, 52a ascertained. The data transfer module 38a outputs data ascertained by the electrical sensor unit 24a, in particular the corrosion indicator 20a, 52a, to further components of the corrosion monitoring unit 18a. The corrosion monitoring unit 18a comprises at least one data logger module 40a. The data logger module 40a is configured for recording at least one output of the data transfer module 38*a*. The data logger module 40*a* is configured for recording a time series of the corrosion indicator 20*a* (also cf. FIG. 6), of the further corrosion indicator 52*a*, of a parameter detected by the environment sensor unit 56*a* and/or of the parameter detected by the impact sensor unit 58*a*. The data logger module 40*a* comprises a storage unit 144*a* having a physical and/or virtual memory. The storage unit 144*a* is configured for at least temporarily storing corrosion indicators 20*a*, 52*a* and/or time series recorded by the data logger module 40*a*.

The corrosion monitoring unit 18*a* comprises at least one correction module 46*a*. The correction module 46*a* is configured at least for identifying and/or correcting systematic errors that potentially occur during monitoring of the corrosion and/or of a corrosion indicator 20*a*, 52*a*. The correction module 46*a* is configured for automatically identifying drifts in a data set and/or a time series. For drift identification, the correction module 46*a* can have recourse to computational capacities of the control and/or regulation unit 114*a*.

The corrosion monitoring unit 18*a* comprises a communication module 42*a*. The communication module 42*a* is configured at least for communicating data output by the data transfer module 38*a* to an external receiver 44*a*. The communication module 42 comprises a transmitting and/or receiving antenna 146*a* for transmitting and/or receiving electromagnetic waves as information carriers. The communication module 42*a* is configured for communicating by means of a telecommunication connection. The communication module 42*a* is configured for sending data concerning corrosion indicators 20*a*, 52*a* and/or ambient and/or weather parameters in an automated manner. The communication module 42*a* is configured for sending messages, in particular text messages, in an automated manner. The communication module 42*a* communicates by means of a mobile radio standard for data transfer. The mobile radio standard is embodied as a GSM data connection. Alternatively, the mobile radio standard could be embodied as an EDGE data connection, a GPRS data connection and/or an HSCSD data connection.

The corrosion monitoring unit 18*a* comprises a contacting unit 188*a*. The contacting unit 188*a* comprises two contact terminals 190*a*. The contact terminals 190*a* are configured for contacting a corrosion element 26*a* for ascertaining the corrosion indicator 20*a*. The contact terminals 190*a* are connected to the base body 104*a* by means of a cable connection 122*a*.

The monitoring device comprises a photovoltaic unit 50*a*. The photovoltaic unit 50*a* is configured for supplying current and/or voltage to the corrosion monitoring unit 18*a*, in particular the components of the corrosion monitoring unit 18*a*. The photovoltaic unit 50*a* comprises a solar panel 152*a* having solar cells. The solar panel 152*a* is configured for converting light into electrical energy. The corrosion monitoring unit 18*a* comprises a rechargeable battery 148*a*. The corrosion monitoring unit 18*a* comprises a battery 150*a*. The rechargeable battery 148*a* and/or the battery 150*a* are/is configured for supplying current and/or voltage to the corrosion monitoring unit 18*a*, in particular the components of the corrosion monitoring unit 18*a*. The photovoltaic unit 50*a* is configured for electrically charging the rechargeable battery 148*a*. The battery 150*a* is configured for supplying current and/or voltage to the corrosion monitoring unit 18*a* when the rechargeable battery 148*a* is discharged.

Figure 4A:
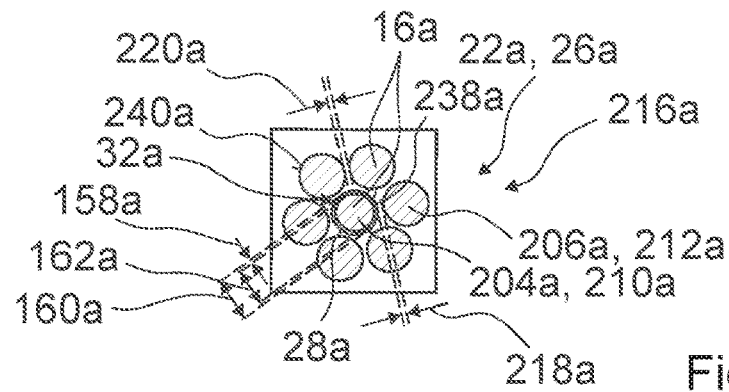

FIG. 4*a* shows a cross section of a corrosion element 26*a*. The corrosion element 26*a* is embodied as a corrosion checking element 22*a*, 48*a*. The corrosion checking element 22*a*, 48*a* is embodied as an ACM sensor 216*a*. The ACM sensor 216*a* comprises seven electrodes 204*a*, 206*a*. The electrodes 204*a*, 206*a* are oriented parallel to one another. Six outer electrodes 206*a* are arranged circularly around a central electrode 204*a*. One electrode 204*a* forms an anode 210*a*. One electrode 206*a* forms a cathode 212*a*. The six outer electrodes 206*a* together form a cathode 212*a*. The electrode 204*a* forming the anode 210*a* is embodied substantially identically to the wire 14*a*. The electrode 204*a* forming the anode 210*a* has a coating 28*a*. The coating 28*a* of the anode 210*a* is embodied at least substantially identically to an anticorrosion protective coating 30*a* of the wire 14*a* of the wire netting 10*a* to be monitored. The electrodes 206*a* forming the cathode 212*a* have, at least in the region of the cross section shown, an outer shape that is substantially identical to an outer shape of the anode 210*a*. A surface 240*a* of the electrodes 206*a* forming the cathode 212*a* comprises a more electropositive metal than a surface 238*a* of the cathode 212*a*. The surface 240*a* of the cathode 212*a* is formed from a steel, in particular a high-tensile steel 16*a*. The surface 238*a* of the anode 210*a* is formed from zinc. The electrodes 204*a*, 206*a* are arranged in a manner not touching one another. The ACM sensor 216*a* comprises an electrical insulator 32*a*. The electrical insulator 32*a* is embodied as an air gap. There is a distance 218*a* between the anode 210*a* and the electrodes 206*a* of the cathode 212*a*. The distance 218*a* between the anode 210*a* and the electrodes 206*a* of the cathode 212*a* is 0.2 mm. There is a distance 220*a* between the electrodes 206*a* of the cathode 212*a*. The distance 220*a* between the electrodes 206*a* of the cathode 212*a* is 0.2 mm.

Figure 4B:
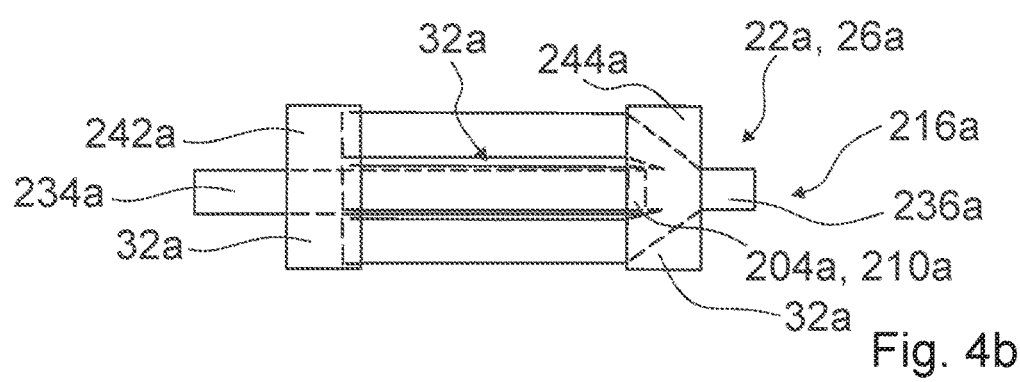

FIG. 4*b* shows a side view of the corrosion checking element 22*a*, 48*a* embodied as an ACM sensor 216*a*. At the lateral ends, the ACM sensor 216*a* comprises two end caps 242*a*, 244*a* embodied as insulators 32*a*. The end caps 242*a*, 244*a* serve as a hold for the electrodes 204*a*, 206*a*. The electrode 204*a* of the anode 210*a* is led through an end cap 242*a*. The led-through part of the anode 210*a* forms the contact element 234*a*. The electrodes 206*a* of the cathode 212*a* are brought together in an end cap 244*a* and led jointly through the end cap 244*a*. The led-through part of the cathode 212*a* forms the further contact element 236*a*. In the dry state, owing to the insulator 32*a*, the connection between anode 210*a* and cathode 212*a* is free of current. In the event of wetting of the ACM sensor 216*a*, for example as a result of condensation moisture or precipitation moisture, a current can flow by means of conductive particles, for example ions, dissolved in water. Different redox potentials of the different materials of anode 210*a* and cathode 212*a* drive this current flow. In the event of current flow, material is eroded from the anode 210*a*. The current flow is proportional to the material erosion (cf. FIG. 6). The current flow is dependent on the type and amount of chemicals dissolved in water. By way of example, a rising amount of salts, for example sulfates or sodium chloride, results in an increased current flow.

In the alternative embodiment of an ACM sensor 216'*a* as shown in FIG. 5*a*, an alternative arrangement of the electrodes 204'*a*, 206'*a* of the ACM sensor 216'*a* is shown. The electrodes 204'*a*, 206'*a* have an outer shape corresponding to a halved wire. On their flat side, the electrodes 204'*a*, 206'*a* are applied on a substrate 246'*a*. The substrate 246'*a* is embodied as an electrical insulator 32'*a*. The electrodes 204'*a*, 206'*a* are oriented parallel to one another. The electrodes 204'*a*, 206'*a* are oriented on a common plane. The electrodes 204'*a*, 206'*a* are arranged at a distance from one another. A distance 248'*a* between two electrodes 204'*a*, 206'*a* is 0.2 mm. Two central electrodes 204'*a* form an anode 210'a. Six outer electrodes 206'a form a cathode 212'a. The two electrodes 204'a of the anode 210'a are brought together at one lateral end of the ACM sensor 216'a to form a contact element 234'a (cf. FIG. 5b). The six electrodes 206'a of the cathode 212'a are brought together at a further lateral end of the ACM sensor 216'a to form a further contact element 236'a.

FIG. 6 shows a current-time diagram 224a. A current flow of the ACM sensor 216a is plotted on the abscissa 66a. A time is plotted on the ordinate 68a. The current flow exhibits an alternating curve profile 222a. The curve profile 222a exhibits partial sections without a current flow. A curve profile 226a of material erosion of the anode 210a is shown as a dashed curve. The curve profile 222a of the current flow and the curve profile 226a of the material erosion correlate. A high value of current flow means a high value of the material erosion, and vice versa. A rise in the current flow is indicative of an intensification of the corrosion. In the event of the current flow falling to zero, a time t starts to elapse in the control and/or regulation unit 114a. If the time t reaches a threshold value 70a without the current flow having risen to a value above zero again in the meantime, the communication module 42a sends a warning message.

FIG. 7 shows a flow diagram of a method for monitoring corrosion of a wire netting 10a. In at least one method step 192a, the corrosion indicator 20a is monitored by the corrosion monitoring unit 18a. In at least one method step 202a, the corrosion indicator 20a is ascertained by means of the electrical sensor unit 24a. In at least one method step 250a, an intensity of the corrosion is determined by means of a current flow of the ACM sensor 216a. In at least one method step 194a, progress of the corrosion is determined by means of a change in the electrical resistance and/or a change in the electrical conductivity of the corrosion element 26a and/or of the corrosion checking element 22a. In at least one method step 88a, an automatic notification is triggered, in particular sent automatically by means of the communication module 42a, in the event of the threshold value 70a of the corrosion indicator 20a being exceeded, undershot and/or reached.

FIGS. 8 to 16 show three further exemplary embodiments of the invention. The following descriptions and the drawings are limited essentially to the differences between the exemplary embodiments, wherein with regard to identically designated component parts, in particular in regard to component parts having identical reference signs, reference may also be made, in principle, to the drawings and/or the description of the other exemplary embodiments, in particular of FIGS. 1 to 7. In order to differentiate the exemplary embodiments, the letter a is appended to the reference signs of the exemplary embodiment in FIGS. 1 to 7. The letter a is replaced by the letters b to d in the exemplary embodiments in FIGS. 8 to 15.

FIG. 8 shows an alternative monitoring device for monitoring corrosion of a wire netting 10b. The monitoring device comprises a corrosion monitoring unit 18b. The corrosion monitoring unit 18b is configured for monitoring at least one alternative corrosion indicator 20b. The corrosion monitoring unit 18b is configured for monitoring an alternative corrosion element 26b, in particular corrosion indicators 20b of the corrosion element 26b. The corrosion element 26b is embodied as a corrosion checking element 22b. The corrosion checking element 22 is embodied substantially identically to a segment of a wire 14b of the wire netting 10b. The corrosion checking element 22b has a straight, wire-like shape 154b. In an initial state, the corrosion checking element 22b has an outer cross section 34b (cf. FIG. 13) that is at least substantially identical to an outer cross section 36b of the wire 14b of the wire netting 10b to be monitored in a delivery state of the wire netting 10b.

The corrosion indicator 20b is embodied as a physical and/or chemical property of a corrosion element 26b. The corrosion indicator 20b comprises at least an electrical conductivity of the corrosion element 26b and/or at least an electrical resistance of the corrosion element 26b. The corrosion indicator 20b comprises an electrical conductivity of a coating 28b of the corrosion element 26b and/or an electrical resistance of the coating 28b of the corrosion element 26b (cf. FIG. 9 and FIG. 10). The corrosion monitoring unit 18b comprises at least one further corrosion checking element 48b. The further corrosion checking element 48b is embodied at least substantially identically to the corrosion checking element 22b. The further corrosion checking element 48b has a straight, wire-like shape 156b. FIG. 9 shows a resistance-time diagram 166b. The ohmic resistance resulting from the corrosion element 26b is plotted on the abscissa 66b. A time is plotted on the ordinate 68b. The ohmic resistance exhibits a rising curve profile 168b. A rise in the ohmic resistance is indicative of the corrosion progressing. In addition, a dashed line depicts a threshold value 70b of the ohmic resistance. The threshold value 70b is constant over time. The rising curve profile 168b exceeds the threshold value 70b at a point in time T.

FIG. 10 shows a conductivity-time diagram 170b. The electrical conductivity resulting from the corrosion element 26b is plotted on the abscissa 66b. A time is plotted on the ordinate 68b. The electrical conductivity exhibits a falling curve profile 172b. A fall in the electrical conductivity is indicative of the corrosion progressing. In addition, a dashed line depicts a threshold value 70b of the electrical conductivity. The threshold value 70b is constant over time. The falling curve profile 172b falls below the threshold value 70b at a point in time T.

FIG. 11 shows the alternative corrosion monitoring unit 18b having a second further alternative corrosion checking element 22'b and a second further alternative further corrosion checking element 48'b. The corrosion checking element 22'b comprises two legs 174b, 176b and a bending region 178b. The further corrosion checking element 48'b comprises two legs 180b, 182b and a bending region 184b. The legs 174b, 176b, 180b, 182b are embodied at least substantially identically to the legs 74b, 76b of the helix 72b of the wire netting 10b. The bending regions 178b, 184b are embodied at least substantially identically to the bending region 78b of the helix 72b. The corrosion checking element 22'b and the further corrosion checking element 48'b engage in one another. The corrosion indicator 20b is tapped off between the two legs 174b, 176b of the corrosion checking element 22'b. The two legs 180b, 182b of the further corrosion checking element 48'b are electrically insulated on holders 102b of the holding unit 100b of the corrosion monitoring unit 18b. The arrangement of corrosion checking elements 22'b, 48'b as shown in FIG. 11 advantageously replicates an arrangement of helices 72b of the wire netting 10b, as a result of which realistic corrosion monitoring can advantageously be made possible.

FIG. 12 shows the alternative corrosion monitoring unit 18b having a third further alternative corrosion checking element 22"b. The corrosion checking element 22"b is embodied as a net element 12b of a ring mesh (not shown). The corrosion checking element 22"b is embodied as a ring element 186b, closed on itself, of a ring mesh. The corrosion indicator 20b is tapped off between two contact points of the corrosion checking element 22"b with a respective holder 102b. The corrosion checking element 22″b shown in FIG. 12 advantageously replicates a ring element 186b of a ring mesh, as a result of which realistic corrosion monitoring of a ring mesh can advantageously be made possible.

FIG. 13 shows a cross section of an alternative corrosion element 26b. The corrosion element 26b has the coating 28b. The coating 28b of the corrosion element 26b is embodied at least substantially identically to an anticorrosion protective coating 30b of the wire 14b of the wire netting 10b to be monitored. The coating 28b of the corrosion element 26b has a layer thickness 158b that is at least substantially identical to a layer thickness 94b of the anticorrosion protective coating 30b of the wire 14b. The coating 28b of the corrosion element 26b has an outer diameter 160b that is at least substantially identical to a total diameter 92b of the wire 14b, in particular including the anticorrosion protective coating 30b of the wire 14b. The coating 28b of the corrosion element 26b has an inner diameter 162b that is at least substantially identical to a diameter 96b of a wire core 90b of the wire 14b. The coating 28b of the corrosion element 26b is formed from a material that is at least substantially identical to the material of the coating 28b of the wire 14b.

The monitoring device comprises an electrical insulator 32b. The corrosion element 26b comprises the electrical insulator 32b. The corrosion checking element 22b comprises the electrical insulator 32b. The electrical insulator 32b is configured for at least partly spatially delimiting a current flow through the corrosion element 26b and/or the corrosion checking element 22b. The current flow is spatially delimited by the electrical insulator 32b to a part of the corrosion element 26b and/or of the corrosion checking element 22b that is exposed the most to the corrosion. The current flow is spatially delimited by the electrical insulator 32b to a part of the corrosion element 26b and/or of the corrosion checking element 22b that is near the surface. "Near the surface" should be understood to mean, in particular, an outer region of the corrosion element 26b and/or of the corrosion checking element 22b, which outer region is in the shape of a lateral surface of a cylinder and has a maximum depth of 0.05*r, preferably 0.1*r and preferably 0.2*r, wherein r represents in particular a radius 200b of the corrosion element 26b and/or of the corrosion checking element 22b. The current flow is spatially delimited by the electrical insulator 32b to a coating 28b of the corrosion element 26b and/or of the corrosion checking element 22b. The electrical insulator 32b is produced from a corrosion-resistant, electrically nonconductive material, preferably from a plastic and/or a glass. The electrical insulator 32b is arranged at least partly in an interior of the corrosion element 26b. In the exemplary embodiment shown in FIG. 13, the electrical insulator 32b forms an insulating core 164b of the corrosion element 26b. The coating 28b of the corrosion element 26b is applied in an adhering manner on the insulating core 164b of the corrosion element 26b in a manner enclosing it in a circumferential direction.

The exemplary embodiment shown in FIG. 14 shows a corrosion element 26b having an alternative electrical insulator 32′b. The electrical insulator 32′b is embodied as an insulating intermediate layer between the wire core 90b of the corrosion element 26b and the coating 28b of the corrosion element 26b. The electrical insulator 32′b electrically isolates the wire core 90b of the corrosion element 26b and the coating 28b of the corrosion element 26b. The electrical insulator 32′b of the corrosion element 26b has a tube shape. The electrical insulator 32′b of the corrosion element 26b has a layer thickness 196b. The layer thickness 196b is less than the layer thickness 94b of the coating 28b of the corrosion element 26b. The electrical insulator 32′b of the corrosion element 26b adheres on a high-tensile steel 16b of the wire core 90b of the corrosion element 26b. The electrical insulator 32′b of the corrosion element 26b adheres on the coating 28b of the corrosion element 26b. The electrical insulator 32′b of the corrosion element 26b results in an improvement in adhesion of the coating 28b of the corrosion element 26b.

FIG. 15 shows a fourth further alternative corrosion checking element 22c of the corrosion monitoring unit 18c of the monitoring device for monitoring corrosion of a wire netting 10c. The corrosion checking element 22c is embodied as a stick indicator 208c. The stick indicator 208c comprises seven corrosion checking sticks 214c. The corrosion checking sticks 214c have a coating 28c on their surface. The coating 28c of the corrosion checking sticks 214c is different in each case. The coating 28c of the corrosion checking sticks 214c has a different thickness in each case. The coatings 28c of the corrosion checking sticks 214c are arranged in an ascending manner from top to bottom according to the thickness of the coating 28c. The five topmost corrosion checking sticks 214c have a coating 28c that is thinner than an anticorrosion protective coating 30c of a wire 14c of the wire netting 10c to be monitored. The sixth corrosion checking stick 214c has a coating 28c having a thickness that is substantially equal to that of the anticorrosion protective coating 30c of the wire 14c of the wire netting 10c to be monitored. The seventh corrosion checking stick 214c has a coating 28c that is thicker than the anticorrosion protective coating 30c of the wire 14c of the wire netting 10c to be monitored. The material of the coating 28c of the corrosion checking sticks 214c substantially corresponds to the material of the anticorrosion protective coating 30c of the wire 14c of the wire netting 10c to be monitored. The coating 28c of the corrosion checking sticks 214c is embodied as a zinc coating 86c. The stick indicator 208c is configured for being fitted in a region near the wire netting 10c. Alternatively, it is conceivable for the stick indicator 208c to be set up independently of a wire netting 10c at a monitor location. As a result, it is advantageously possible to ascertain a corrosiveness of a location prior to installation of a wire netting 10c, as a result of which an optimized selection of an anticorrosion protective coating 30c of the wire 14c of the wire netting 10c to be installed can advantageously be made possible. The stick indicator 208c comprises mounting elements 252c. The mounting elements 252c are embodied as holes for leading a mounting means through them. A mounting means can be embodied as a cable tie, for example. The corrosion checking sticks 214c are exposed to corrosive ambient conditions, for example weather situations, at the monitor location. The corrosion checking sticks 214c corrode analogously to the wire netting 10c to be monitored. As corrosion progresses, the coating 28c is gradually eroded from each corrosion checking stick 214c. Once the coating 28c has been completely eroded, the underlying core material of the corrosion checking stick 214c appears. The core material substantially corresponds to a material of a wire core 90c of the wire 14c. The core material is high-tensile steel 16c. As corrosion progresses further, red rust forms on the high-tensile steel 16c. A status of the corrosion can advantageously be determined by means of optical observation of the stick indicator 208c. A material erosion can advantageously be estimated on the basis of a number of the corrosion checking sticks 214c which already have red rust. A camera 120c of an electrical sensor unit 24c, 54c of the corrosion monitoring unit 18c is configured for recording images of the stick indicator 208*c*. By means of a communication module 42*c* of the corrosion monitoring unit 18*c*, the recorded images of the stick indicator 208*c* are made available to an operator for observation. Alternatively or additionally, a drone 230*c* of the monitoring device can fly past and photograph stick indicators 208*c*. The stick indicator 208*c* comprises four alignment features 254*c*. The alignment features 254*c* are embodied as crosses. The alignment features 254*c* are arranged in each case in the region near a corner of the stick indicator 208*c*. The stick indicator 208*c* has an identification feature 256*c*. The identification feature 256*c* is embodied as a barcode. The identification feature 256*c* serves for assigning a stick indicator 208*c* to a location and/or a wire netting 10*c*.

FIG. 16 shows an alternative system 62*d* for monitoring corrosion of a wire netting 10*d*. The system 62*d* comprises a monitoring device. The system 62*d* comprises a wire netting 10*d*. The wire netting 10*d* is embodied as a protective net for catching and/or intercepting heavy loads. The wire netting 10*d* is formed from inter-engaging net elements 12*d*. The net element 12*d* is produced from a wire 14*d*. The wire 14*d* is produced from a high-tensile steel 16*d*. The wire netting 10*d* comprises an indicator element 64*d*. The indicator element 64*d* at least partly forms a corrosion element 26*d* to be monitored directly. The indicator element 64*d* is embodied as a net element 12*d* interwoven in the wire netting 10*d*. The monitoring device comprises a corrosion monitoring unit 18*d*. The corrosion monitoring unit 18*d* is configured for directly monitoring a corrosion element 26*d*. The corrosion monitoring unit 18*d* comprises a contacting unit 188*d*. The contacting unit 188*d* comprises two contact terminals 190*d*. The contact terminals 190*d* electrically contact the indicator element 64*d* at two separate locations. The contact terminals 190*d* electrically contact a coating 28*d* of the indicator element 64*d* at two separate locations. For monitoring the corrosion indicator 20*d*, a current flows from one contact terminal 190*d* to the other contact terminal 190*d* through the indicator element 64*d*.

The invention claimed is:

1. A monitoring device, in particular a wire netting monitoring device, for a wire netting, in particular for a protective net for stabilizing, catching and/or intercepting and/or retaining heavy loads, having at least two inter-engaging net elements, at least one net element of which is produced from at least one single wire, a wire bundle, a wire strand, a wire rope and/or some other longitudinal element having at least one wire that is in particular produced from a high-tensile steel, comprising at least one corrosion monitoring unit configured for monitoring at least one corrosion indicator and wherein the corrosion monitoring unit comprises at least one impact sensor unit configured for sensing impacts of dynamic impact bodies into a wire netting to be monitored.

2. The monitoring device as claimed in claim 1, wherein the corrosion monitoring unit comprises at least one corrosion checking element configured for supplying at least partial information for a determination of the corrosion indicator.

3. The monitoring device as claimed in claim 2, wherein the corrosion checking element is embodied as an ACM (Atmospheric Corrosion Monitor) sensor.

4. The monitoring device as claimed in claim 2, wherein the corrosion checking element is embodied as a stick indicator having a plurality of differently coated corrosion checking sticks.

5. The monitoring device as claimed in claim 1, wherein the corrosion monitoring unit comprises at least one data transfer module.

6. The monitoring device as claimed in claim 5, wherein the corrosion monitoring unit comprises at least one data logger module configured for recording at least one output of the data transfer module.

7. The monitoring device as claimed in claim 5, wherein the corrosion monitoring unit comprises at least one communication module configured at least for communicating data output by the data transfer module to an external receiver.

8. The monitoring device as claimed in claim 1, wherein the corrosion monitoring unit comprises at least one correction module configured at least for identifying and/or correcting systematic errors potentially occurring during monitoring of the corrosion.

9. The monitoring device as claimed in claim 1, wherein the corrosion monitoring unit comprises at least one electrical sensor unit configured for monitoring the at least one corrosion indicator.

10. The monitoring device as claimed in claim 9, wherein the electrical sensor unit comprises at least one zero-resistance ammeter.

11. The monitoring device as claimed in claim 1, wherein the corrosion indicator comprises at least an electrical conductivity of a corrosion element, at least an electrical resistance of a corrosion element and/or at least a current flow between at least two electrodes.

12. The monitoring device as claimed in claim 1, wherein the corrosion indicator comprises at least an electrical conductivity of a coating of a corrosion element, at least an electrical resistance of a coating of a corrosion element and/or at least a current flow between at least a coating of at least one corrosion element and at least one further electrode.

13. The monitoring device at least as claimed in claim 12, wherein a coating of a corrosion element is embodied at least substantially identically to an anticorrosion protective coating of at least one wire of a wire netting to be monitored.

14. The monitoring device as claimed in claim 1, comprising at least one electrical insulator, in particular at least for an at least partial spatial delimitation of a current flow through at least one corrosion element.

15. The monitoring device as claimed in claim 14, wherein the electrical insulator is arranged in an interior of the corrosion element.

16. The monitoring device at least as claimed in claim 2, wherein the corrosion checking element in an initial state has an outer cross section which is at least substantially identical to an outer cross section of a wire of a wire netting to be monitored in a delivery state of the wire netting.

17. The monitoring device at least as claimed in claim 2, wherein the corrosion monitoring unit comprises at least one further corrosion checking element.

18. The monitoring device as claimed in claim 17, wherein the at least one further corrosion checking element has a spatial orientation which is significantly different than a spatial orientation of the corrosion checking element.

19. The monitoring device as claimed in claim 1, wherein at least the corrosion monitoring unit is operable in a pulsed manner.

20. The monitoring device as claimed in claim 1, comprising at least one photovoltaic unit.

21. The monitoring device as claimed in claim 1, wherein the corrosion monitoring unit is configured for monitoring at least one further corrosion indicator different than the corrosion indicator.

22. The monitoring device as claimed in claim 21, wherein the corrosion monitoring unit comprises at least one further electrical sensor unit configured for monitoring the further corrosion indicator, in particular by a detection method different than a detection method of the electrical sensor unit.

23. The monitoring device as claimed in claim 1, wherein the corrosion monitoring unit comprises at least environment sensor unit configured for monitoring at least one ambient and/or weather parameter.

24. A monitoring system having a plurality of monitoring devices as claimed in claim 1.

25. The monitoring system as claimed in claim 24, wherein the monitoring devices are networked.

26. A system for monitoring corrosion of a wire netting, having at least one monitoring device as claimed in claim 1 and having at least one wire netting.

27. The system as claimed in claim 26, wherein the wire netting comprises at least one indicator element which at least partly forms a corrosion element that is to be monitored directly.

28. The system as claimed in claim 27, wherein the indicator element is embodied as a net element braided in the wire netting.

29. A method for monitoring corrosion of a wire netting, in particular of a protective net for stabilizing, catching and/or intercepting and/or retaining heavy loads, by means of a monitoring device as claimed in claim 1, having at least two inter-engaging net elements, at least one net element of which is produced from at least one single wire, a wire bundle, a wire strand, a wire rope and/or some other longitudinal element having at least one wire, which is in particular produced from a high-tensile steel, wherein at least one corrosion indicator is monitored and wherein impacts of dynamic impact bodies into the wire netting are monitored.

30. The method as claimed in claim 29, wherein at least an intensity of corrosion is determined by means of a current value of a current flow.

31. The method at least as claimed in claim 29, wherein at least a progress of corrosion is determined by means of a change in an electrical resistance and/or a change in an electrical conductivity.

32. The method as claimed in claim 29, wherein an automatic notification is triggered in the event of a threshold value of the corrosion indicator being exceeded, undershot and/or reached.

33. A monitoring device, in particular a wire netting monitoring device, for a wire netting, in particular for a protective net for stabilizing, catching and/or intercepting and/or retaining heavy loads, having at least two inter-engaging net elements, at least one net element of which is produced from at least one single wire, a wire bundle, a wire strand, a wire rope and/or some other longitudinal element having at least one wire that is in particular produced from a high-tensile steel, comprising at least one corrosion monitoring unit configured for monitoring at least one corrosion indicator and wherein at least the corrosion monitoring unit is operable in a pulsed manner.

34. A monitoring device, in particular a wire netting monitoring device, for a wire netting, in particular for a protective net for stabilizing, catching and/or intercepting and/or retaining heavy loads, having at least two inter-engaging net elements, at least one net element of which is produced from at least one single wire, a wire bundle, a wire strand, a wire rope and/or some other longitudinal element having at least one wire that is in particular produced from a high-tensile steel, comprising at least one corrosion monitoring unit configured for monitoring at least one corrosion indicator and wherein the monitoring device comprises at least one photovoltaic unit.

* * * * *